US009799330B2

United States Patent
Nemala et al.

(10) Patent No.: US 9,799,330 B2
(45) Date of Patent: Oct. 24, 2017

(54) MULTI-SOURCED NOISE SUPPRESSION

(71) Applicant: Knowles Electronics, LLC, Itasca, IL (US)

(72) Inventors: Sridhar Krishna Nemala, Mountain View, CA (US); John Woodruff, Palo Alto, CA (US); Tony Verma, San Francisco, CA (US); Frederic Caldwell, San Jose, CA (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 14/838,133

(22) Filed: Aug. 27, 2015

(65) Prior Publication Data

US 2016/0063997 A1 Mar. 3, 2016

Related U.S. Application Data

(60) Provisional application No. 62/043,344, filed on Aug. 28, 2014.

(51) Int. Cl.
*G10L 15/00* (2013.01)
*G10L 15/20* (2006.01)
(Continued)

(52) U.S. Cl.
CPC .......... *G10L 15/20* (2013.01); *G10L 21/0216* (2013.01); *G10L 25/06* (2013.01);
(Continued)

(58) Field of Classification Search
None
See application file for complete search history.

(56) References Cited

U.S. PATENT DOCUMENTS 3,976,863 A 8/1976 Engel
3,978,287 A 8/1976 Fletcher et al.
(Continued)

FOREIGN PATENT DOCUMENTS

EP 0756437 A2 1/1997
EP 1232496 A1 8/2002
(Continued)

OTHER PUBLICATIONS

International Search Report & Written Opinion dated Nov. 27, 2015 in Patent Cooperation Treaty Application No. PCT/US2015/047263, filed Aug. 27, 2015.
(Continued)

*Primary Examiner* — Marcus T Riley
(74) *Attorney, Agent, or Firm* — Foley & Lardner LLP

(57) ABSTRACT

Systems and methods for multi-sourced noise suppression are provided. An example system may receive streams of audio data including a voice signal and noise, the voice signal including a spoken word. The streams of audio data are provided by distributed audio devices. The system can assign weights to the audio streams based at least partially on quality of the audio streams. The weights of audio streams can be determined based on signal-to-noise ratios (SNRs). The system may further process, based on the weights, the audio stream to generate cleaned speech. Each audio device comprises microphone(s) and can be associated with the Internet of Things (IoT), such that the audio devices are Internet of Things devices. The processing can include noise suppression and reduction and echo cancellation. The cleaned speech can be provided to a remote device for further processing which may include Automatic Speech Recognition (ASR).

20 Claims, 5 Drawing Sheets

(51) Int. Cl.
*G10L 21/0216* (2013.01)
*G10L 25/06* (2013.01)
G10L 21/0208 (2013.01)
G10L 15/30 (2013.01)

(52) U.S. Cl.
CPC .... *G10L 15/30* (2013.01); *G10L 2021/02082* (2013.01); *G10L 2021/02166* (2013.01)

(56) References Cited

U.S. PATENT DOCUMENTS

| | | |
|---|---|---|
| 4,137,510 A | 1/1979 | Iwahara |
| 4,433,604 A | 2/1984 | Ott |
| 4,516,259 A | 5/1985 | Yato et al. |
| 4,535,473 A | 8/1985 | Sakata |
| 4,536,844 A | 8/1985 | Lyon |
| 4,581,758 A | 4/1986 | Coker et al. |
| 4,628,529 A | 12/1986 | Borth et al. |
| 4,630,304 A | 12/1986 | Borth et al. |
| 4,649,505 A | 3/1987 | Zinser, Jr. et al. |
| 4,658,426 A | 4/1987 | Chabries et al. |
| 4,674,125 A | 6/1987 | Carlson et al. |
| 4,718,104 A | 1/1988 | Anderson |
| 4,811,404 A | 3/1989 | Vilmur et al. |
| 4,812,996 A | 3/1989 | Stubbs |
| 4,864,620 A | 9/1989 | Bialick |
| 4,920,508 A | 4/1990 | Yassaie et al. |
| 4,991,166 A | 2/1991 | Julstrom |
| 5,011,853 A | 4/1991 | Olney |
| 5,027,410 A | 6/1991 | Williamson et al. |
| 5,054,085 A | 10/1991 | Meisel et al. |
| 5,058,419 A | 10/1991 | Nordstrom et al. |
| 5,099,738 A | 3/1992 | Hotz |
| 5,115,404 A | 5/1992 | Lo et al. |
| 5,119,711 A | 6/1992 | Bell et al. |
| 5,142,961 A | 9/1992 | Paroutaud |
| 5,150,413 A | 9/1992 | Nakatani et al. |
| 5,175,769 A | 12/1992 | Hejna, Jr. et al. |
| 5,177,482 A | 1/1993 | Cideciyan et al. |
| 5,187,776 A | 2/1993 | Yanker |
| 5,208,864 A | 5/1993 | Kaneda |
| 5,210,366 A | 5/1993 | Sykes, Jr. |
| 5,216,423 A | 6/1993 | Mukherjee |
| 5,222,251 A | 6/1993 | Roney, IV et al. |
| 5,224,170 A | 6/1993 | Waite, Jr. |
| 5,230,022 A | 7/1993 | Sakata |
| 5,319,736 A | 6/1994 | Hunt |
| 5,323,459 A | 6/1994 | Hirano |
| 5,341,432 A | 8/1994 | Suzuki et al. |
| 5,381,473 A | 1/1995 | Andrea et al. |
| 5,381,512 A | 1/1995 | Holton et al. |
| 5,400,409 A | 3/1995 | Linhard |
| 5,402,493 A | 3/1995 | Goldstein |
| 5,402,496 A | 3/1995 | Soli et al. |
| 5,406,635 A | 4/1995 | Jarvinen |
| 5,416,847 A | 5/1995 | Boze |
| 5,471,195 A | 11/1995 | Rickman |
| 5,473,759 A | 12/1995 | Slaney et al. |
| 5,479,564 A | 12/1995 | Vogten et al. |
| 5,502,663 A | 3/1996 | Lyon |
| 5,544,250 A | 8/1996 | Urbanski |
| 5,546,458 A | 8/1996 | Iwami |
| 5,550,924 A | 8/1996 | Helf et al. |
| 5,574,824 A | 11/1996 | Slyh et al. |
| 5,590,241 A | 12/1996 | Park et al. |
| 5,602,962 A | 2/1997 | Kellermann |
| 5,625,697 A | 4/1997 | Bowen et al. |
| 5,633,631 A | 5/1997 | Teckman |
| 5,675,778 A | 10/1997 | Jones |
| 5,694,474 A | 12/1997 | Ngo et al. |
| 5,706,395 A | 1/1998 | Arslan et al. |
| 5,717,829 A | 2/1998 | Takagi |
| 5,729,612 A | 3/1998 | Abel et al. |
| 5,732,189 A | 3/1998 | Johnston et al. |
| 5,749,064 A | 5/1998 | Pawate et al. |
| 5,754,665 A | 5/1998 | Hosoi |
| 5,757,937 A | 5/1998 | Itoh et al. |
| 5,774,837 A | 6/1998 | Yeldener et al. |
| 5,777,658 A | 7/1998 | Kerr et al. |
| 5,792,971 A | 8/1998 | Timis et al. |
| 5,796,819 A | 8/1998 | Romesburg |
| 5,806,025 A | 9/1998 | Vis et al. |
| 5,809,463 A | 9/1998 | Gupta et al. |
| 5,819,215 A | 10/1998 | Dobson et al. |
| 5,839,101 A | 11/1998 | Vahatalo et al. |
| 5,845,243 A | 12/1998 | Smart et al. |
| 5,887,032 A | 3/1999 | Cioffi |
| 5,917,921 A | 6/1999 | Sasaki et al. |
| 5,920,840 A | 7/1999 | Satyamurti et al. |
| 5,933,495 A | 8/1999 | Oh |
| 5,943,429 A | 8/1999 | Handel |
| 5,978,824 A | 11/1999 | Ikeda |
| 5,983,139 A | 11/1999 | Zierhofer |
| 5,990,405 A | 11/1999 | Auten et al. |
| 6,002,776 A | 12/1999 | Bhadkamkar et al. |
| 6,061,456 A | 5/2000 | Andrea et al. |
| 6,072,881 A | 6/2000 | Linder |
| 6,084,916 A | 7/2000 | Ott |
| 6,092,126 A | 7/2000 | Rossum |
| 6,097,820 A | 8/2000 | Turner |
| 6,098,038 A | 8/2000 | Hermansky et al. |
| 6,108,626 A | 8/2000 | Cellario et al. |
| 6,122,384 A | 9/2000 | Mauro |
| 6,122,610 A | 9/2000 | Isabelle |
| 6,125,175 A | 9/2000 | Goldberg et al. |
| 6,134,524 A | 10/2000 | Peters et al. |
| 6,137,349 A | 10/2000 | Menkhoff et al. |
| 6,140,809 A | 10/2000 | Doi |
| 6,144,937 A | 11/2000 | Ali |
| 6,173,255 B1 | 1/2001 | Wilson et al. |
| 6,188,797 B1 | 2/2001 | Moledina et al. |
| 6,205,421 B1 | 3/2001 | Morii |
| 6,205,422 B1 | 3/2001 | Gu et al. |
| 6,208,671 B1 | 3/2001 | Paulos et al. |
| 6,216,103 B1 | 4/2001 | Wu et al. |
| 6,222,927 B1 | 4/2001 | Feng et al. |
| 6,223,090 B1 | 4/2001 | Brungart |
| 6,263,307 B1 | 7/2001 | Arslan et al. |
| 6,266,633 B1 | 7/2001 | Higgins et al. |
| 6,317,501 B1 | 11/2001 | Matsuo |
| 6,321,193 B1 | 11/2001 | Nystrom et al. |
| 6,324,235 B1 | 11/2001 | Savell et al. |
| 6,327,370 B1 | 12/2001 | Killion et al. |
| 6,339,706 B1 | 1/2002 | Tillgren et al. |
| 6,339,758 B1 | 1/2002 | Kanazawa et al. |
| 6,343,267 B1 | 1/2002 | Kuhn et al. |
| 6,355,869 B1 | 3/2002 | Mitton |
| 6,363,345 B1 | 3/2002 | Marash et al. |
| 6,381,469 B1 | 4/2002 | Wojick |
| 6,381,570 B2 | 4/2002 | Li et al. |
| 6,389,142 B1 | 5/2002 | Hagen et al. |
| 6,411,930 B1 | 6/2002 | Burges |
| 6,424,938 B1 | 7/2002 | Johansson et al. |
| 6,430,295 B1 | 8/2002 | Handel et al. |
| 6,434,417 B1 | 8/2002 | Lovett |
| 6,449,586 B1 | 9/2002 | Hoshuyama |
| 6,453,284 B1 | 9/2002 | Paschall |
| 6,453,289 B1 | 9/2002 | Ertem et al. |
| 6,456,209 B1 | 9/2002 | Savari |
| 6,469,732 B1 | 10/2002 | Chang et al. |
| 6,477,489 B1 | 11/2002 | Lockwood et al. |
| 6,480,610 B1 | 11/2002 | Fang et al. |
| 6,487,257 B1 | 11/2002 | Gustafsson et al. |
| 6,496,795 B1 | 12/2002 | Malvar |
| 6,513,004 B1 | 1/2003 | Rigazio et al. |
| 6,516,066 B2 | 2/2003 | Hayashi |
| 6,516,136 B1 | 2/2003 | Lee |
| 6,526,140 B1 | 2/2003 | Marchok et al. |
| 6,529,606 B1 | 3/2003 | Jackson, Jr. II et al. |
| 6,531,970 B2 | 3/2003 | McLaughlin et al. |
| 6,549,630 B1 | 4/2003 | Bobisuthi |
| 6,584,203 B2 | 6/2003 | Elko et al. |
| 6,615,170 B1 | 9/2003 | Liu et al. |
| 6,647,067 B1 | 11/2003 | Hjelm et al. |

(56) References Cited

U.S. PATENT DOCUMENTS

| | | |
|---|---|---|
| 6,683,938 B1 | 1/2004 | Henderson |
| 6,717,991 B1 | 4/2004 | Gustafsson et al. |
| 6,718,309 B1 | 4/2004 | Selly |
| 6,738,482 B1 | 5/2004 | Jaber |
| 6,745,155 B1 | 6/2004 | Andringa et al. |
| 6,760,450 B2 | 7/2004 | Matsuo |
| 6,768,979 B1 | 7/2004 | Menendez-Pidal et al. |
| 6,778,954 B1 | 8/2004 | Kim et al. |
| 6,782,363 B2 | 8/2004 | Lee et al. |
| 6,785,381 B2 | 8/2004 | Gartner et al. |
| 6,792,118 B2 | 9/2004 | Watts |
| 6,795,558 B2 | 9/2004 | Matsuo |
| 6,798,886 B1 | 9/2004 | Smith et al. |
| 6,804,203 B1 | 10/2004 | Benyassine et al. |
| 6,804,651 B2 | 10/2004 | Juric et al. |
| 6,810,273 B1 | 10/2004 | Mattila et al. |
| 6,859,508 B1 | 2/2005 | Koyama et al. |
| 6,882,736 B2 | 4/2005 | Dickel et al. |
| 6,915,257 B2 | 7/2005 | Heikkinen et al. |
| 6,915,264 B2 | 7/2005 | Baumgarte |
| 6,917,688 B2 | 7/2005 | Yu et al. |
| 6,934,387 B1 | 8/2005 | Kim |
| 6,978,159 B2 | 12/2005 | Feng et al. |
| 6,982,377 B2 | 1/2006 | Sakurai et al. |
| 6,990,196 B2 | 1/2006 | Zeng et al. |
| 7,010,134 B2 | 3/2006 | Jensen |
| 7,016,507 B1 | 3/2006 | Brennan |
| 7,020,605 B2 | 3/2006 | Gao |
| RE39,080 E | 4/2006 | Johnston |
| 7,031,478 B2 | 4/2006 | Belt et al. |
| 7,035,666 B2 | 4/2006 | Silberfenig et al. |
| 7,042,934 B2 | 5/2006 | Zamir |
| 7,050,388 B2 | 5/2006 | Kim et al. |
| 7,054,452 B2 | 5/2006 | Ukita |
| 7,054,808 B2 | 5/2006 | Yoshida |
| 7,058,572 B1 | 6/2006 | Nemer |
| 7,065,485 B1 | 6/2006 | Chong-White et al. |
| 7,065,486 B1 | 6/2006 | Thyssen |
| 7,072,834 B2 | 7/2006 | Zhou |
| 7,076,315 B1 | 7/2006 | Watts |
| 7,092,529 B2 | 8/2006 | Yu et al. |
| 7,092,882 B2 | 8/2006 | Arrowood et al. |
| 7,099,821 B2 | 8/2006 | Visser et al. |
| 7,110,554 B2 | 9/2006 | Brennan et al. |
| 7,127,072 B2 | 10/2006 | Rademacher et al. |
| 7,142,677 B2 | 11/2006 | Gonopolskiy et al. |
| 7,146,013 B1 | 12/2006 | Saito et al. |
| 7,146,316 B2 | 12/2006 | Alves |
| 7,155,019 B2 | 12/2006 | Hou |
| 7,165,026 B2 | 1/2007 | Acero et al. |
| 7,171,008 B2 | 1/2007 | Elko |
| 7,171,246 B2 | 1/2007 | Mattila et al. |
| 7,174,022 B1 | 2/2007 | Zhang et al. |
| 7,190,665 B2 | 3/2007 | Warke et al. |
| 7,190,775 B2 | 3/2007 | Rambo |
| 7,206,418 B2 | 4/2007 | Yang et al. |
| 7,209,567 B1 | 4/2007 | Kozel et al. |
| 7,221,622 B2 | 5/2007 | Matsuo et al. |
| 7,225,001 B1 | 5/2007 | Eriksson et al. |
| 7,242,762 B2 | 7/2007 | He et al. |
| 7,245,767 B2 | 7/2007 | Moreno et al. |
| 7,246,058 B2 | 7/2007 | Burnett |
| 7,254,242 B2 | 8/2007 | Ise et al. |
| 7,254,535 B2 | 8/2007 | Kushner et al. |
| 7,289,554 B2 | 10/2007 | Alloin |
| 7,289,955 B2 | 10/2007 | Deng et al. |
| 7,327,985 B2 | 2/2008 | Morfitt, III et al. |
| 7,330,138 B2 | 2/2008 | Mallinson et al. |
| 7,339,503 B1 | 3/2008 | Elenes |
| 7,359,520 B2 | 4/2008 | Brennan et al. |
| 7,376,558 B2 | 5/2008 | Gemello et al. |
| 7,383,179 B2 | 6/2008 | Alves et al. |
| 7,395,298 B2 | 7/2008 | Debes et al. |
| 7,412,379 B2 | 8/2008 | Taori et al. |
| 7,433,907 B2 | 10/2008 | Nagai et al. |
| 7,436,333 B2 | 10/2008 | Forman et al. |
| 7,469,208 B1 * | 12/2008 | Kincaid .................. G06Q 99/00 381/104 |
| 7,516,067 B2 | 4/2009 | Seltzer et al. |
| 7,555,434 B2 | 6/2009 | Nomura et al. |
| 7,561,627 B2 | 7/2009 | Chow et al. |
| 7,562,140 B2 | 7/2009 | Clemm et al. |
| 7,574,352 B2 | 8/2009 | Quatieri, Jr. |
| 7,577,084 B2 | 8/2009 | Tang et al. |
| 7,617,099 B2 | 11/2009 | Yang et al. |
| 7,617,282 B2 | 11/2009 | Han |
| 7,657,038 B2 | 2/2010 | Doclo et al. |
| 7,664,640 B2 | 2/2010 | Webber |
| 7,725,314 B2 | 5/2010 | Wu et al. |
| 7,764,752 B2 | 7/2010 | Langberg et al. |
| 7,777,658 B2 | 8/2010 | Nguyen et al. |
| 7,783,032 B2 | 8/2010 | Abutalebi et al. |
| 7,783,481 B2 | 8/2010 | Endo et al. |
| 7,791,508 B2 | 9/2010 | Wegener |
| 7,895,036 B2 | 2/2011 | Hetherington et al. |
| 7,912,567 B2 | 3/2011 | Chhatwal et al. |
| 7,925,502 B2 | 4/2011 | Droppo et al. |
| 7,949,522 B2 | 5/2011 | Hetherington et al. |
| 7,953,596 B2 | 5/2011 | Pinto |
| 8,010,355 B2 | 8/2011 | Rahbar |
| 8,032,364 B1 | 10/2011 | Watts |
| 8,046,219 B2 | 10/2011 | Zurek et al. |
| 8,081,878 B1 | 12/2011 | Zhang et al. |
| 8,098,812 B2 | 1/2012 | Fadili et al. |
| 8,103,011 B2 | 1/2012 | Mohammad et al. |
| 8,107,656 B2 | 1/2012 | Dreßler et al. |
| 8,126,159 B2 | 2/2012 | Goose et al. |
| 8,140,331 B2 | 3/2012 | Lou |
| 8,143,620 B1 | 3/2012 | Malinowski et al. |
| 8,150,065 B2 | 4/2012 | Solbach et al. |
| 8,155,953 B2 | 4/2012 | Park et al. |
| 8,175,291 B2 | 5/2012 | Chan et al. |
| 8,180,064 B1 | 5/2012 | Avendano et al. |
| 8,184,818 B2 | 5/2012 | Ishiguro |
| 8,189,429 B2 | 5/2012 | Chen et al. |
| 8,194,880 B2 | 6/2012 | Avendano |
| 8,194,882 B2 | 6/2012 | Every et al. |
| 8,204,252 B1 | 6/2012 | Avendano |
| 8,204,253 B1 | 6/2012 | Solbach |
| 8,223,988 B2 | 7/2012 | Wang et al. |
| 8,280,731 B2 | 10/2012 | Yu |
| 8,345,890 B2 | 1/2013 | Avendano et al. |
| 8,359,195 B2 | 1/2013 | Li |
| 8,363,850 B2 | 1/2013 | Amada |
| 8,369,973 B2 | 2/2013 | Risbo |
| 8,378,871 B1 | 2/2013 | Bapat |
| 8,447,596 B2 | 5/2013 | Avendano et al. |
| 8,467,891 B2 | 6/2013 | Huang et al. |
| 8,473,285 B2 | 6/2013 | Every et al. |
| 8,488,805 B1 | 7/2013 | Santos et al. |
| 8,494,193 B2 | 7/2013 | Zhang et al. |
| 8,521,530 B1 | 8/2013 | Every et al. |
| 8,538,035 B2 | 9/2013 | Every et al. |
| 8,606,249 B1 | 12/2013 | Goodwin |
| 8,639,516 B2 | 1/2014 | Lindahl et al. |
| 8,682,006 B1 | 3/2014 | Laroche et al. |
| 8,705,759 B2 | 4/2014 | Wolff et al. |
| 8,718,290 B2 | 5/2014 | Murgia et al. |
| 8,737,188 B1 | 5/2014 | Murgia et al. |
| 8,737,532 B2 | 5/2014 | Green et al. |
| 8,744,844 B2 | 6/2014 | Klein |
| 8,750,526 B1 | 6/2014 | Santos et al. |
| 8,762,144 B2 | 6/2014 | Cho et al. |
| 8,774,423 B1 | 7/2014 | Solbach |
| 8,781,137 B1 | 7/2014 | Goodwin |
| 8,804,865 B2 | 8/2014 | Elenes et al. |
| 8,867,759 B2 | 10/2014 | Avendano et al. |
| 8,880,396 B1 | 11/2014 | Laroche et al. |
| 8,886,525 B2 | 11/2014 | Klein |
| 8,949,120 B1 | 2/2015 | Every et al. |
| 8,949,266 B2 * | 2/2015 | Phillips .................. G10L 15/30 704/7 |
| 8,965,942 B1 | 2/2015 | Rossum et al. |
| 9,008,329 B1 | 4/2015 | Mandel et al. |

(56) References Cited

U.S. PATENT DOCUMENTS

| | | |
|---|---|---|
| 9,049,282 B1 | 6/2015 | Murgia et al. |
| 9,076,456 B1 | 7/2015 | Avendano et al. |
| 9,143,857 B2 | 9/2015 | Every et al. |
| 9,185,487 B2 | 11/2015 | Solbach et al. |
| 9,197,974 B1 | 11/2015 | Clark et al. |
| 9,236,874 B1 | 1/2016 | Rossum |
| 9,253,560 B2* | 2/2016 | Goldstein ......... G06F 17/30743 |
| 9,343,056 B1 | 5/2016 | Goodwin |
| 9,544,687 B2* | 1/2017 | Srinivasan ............. H04R 3/002 |
| 2001/0016020 A1 | 8/2001 | Gustafsson et al. |
| 2001/0031053 A1 | 10/2001 | Feng et al. |
| 2001/0044719 A1 | 11/2001 | Casey |
| 2001/0053228 A1 | 12/2001 | Jones |
| 2002/0002455 A1 | 1/2002 | Accardi et al. |
| 2002/0009203 A1 | 1/2002 | Erten |
| 2002/0041693 A1 | 4/2002 | Matsuo |
| 2002/0080980 A1 | 6/2002 | Matsuo |
| 2002/0106092 A1 | 8/2002 | Matsuo |
| 2002/0116187 A1 | 8/2002 | Erten |
| 2002/0133334 A1 | 9/2002 | Coorman et al. |
| 2002/0138263 A1 | 9/2002 | Deligne et al. |
| 2002/0147595 A1 | 10/2002 | Baumgarte |
| 2002/0156624 A1 | 10/2002 | Gigi |
| 2002/0160751 A1 | 10/2002 | Sun et al. |
| 2002/0176589 A1 | 11/2002 | Buck et al. |
| 2002/0177995 A1 | 11/2002 | Walker |
| 2002/0194159 A1 | 12/2002 | Kamath et al. |
| 2003/0014248 A1 | 1/2003 | Vetter |
| 2003/0026437 A1 | 2/2003 | Janse et al. |
| 2003/0033140 A1 | 2/2003 | Taori et al. |
| 2003/0038736 A1 | 2/2003 | Becker et al. |
| 2003/0039369 A1 | 2/2003 | Bullen |
| 2003/0040908 A1 | 2/2003 | Yang et al. |
| 2003/0056220 A1 | 3/2003 | Thornton et al. |
| 2003/0061032 A1 | 3/2003 | Gonopolskiy |
| 2003/0063759 A1 | 4/2003 | Brennan et al. |
| 2003/0072382 A1 | 4/2003 | Raleigh et al. |
| 2003/0072460 A1 | 4/2003 | Gonopolskiy et al. |
| 2003/0095667 A1 | 5/2003 | Watts |
| 2003/0099345 A1 | 5/2003 | Gartner et al. |
| 2003/0099370 A1 | 5/2003 | Moore |
| 2003/0101048 A1 | 5/2003 | Liu |
| 2003/0103632 A1 | 6/2003 | Goubran et al. |
| 2003/0118200 A1 | 6/2003 | Beaucoup et al. |
| 2003/0128851 A1 | 7/2003 | Furuta |
| 2003/0138116 A1 | 7/2003 | Jones et al. |
| 2003/0147538 A1 | 8/2003 | Elko |
| 2003/0169891 A1 | 9/2003 | Ryan et al. |
| 2003/0177006 A1 | 9/2003 | Ichikawa et al. |
| 2003/0191641 A1 | 10/2003 | Acero et al. |
| 2003/0228023 A1 | 12/2003 | Burnett et al. |
| 2004/0001450 A1 | 1/2004 | He et al. |
| 2004/0013276 A1 | 1/2004 | Ellis et al. |
| 2004/0015348 A1 | 1/2004 | McArthur et al. |
| 2004/0042616 A1 | 3/2004 | Matsuo |
| 2004/0047464 A1 | 3/2004 | Yu et al. |
| 2004/0078199 A1 | 4/2004 | Kremer et al. |
| 2004/0102967 A1 | 5/2004 | Furuta et al. |
| 2004/0125965 A1 | 7/2004 | Alberth, Jr. et al. |
| 2004/0131178 A1 | 7/2004 | Shahaf et al. |
| 2004/0133421 A1 | 7/2004 | Burnett et al. |
| 2004/0148166 A1 | 7/2004 | Zheng |
| 2004/0165736 A1 | 8/2004 | Hetherington et al. |
| 2004/0185804 A1 | 9/2004 | Kanamori et al. |
| 2004/0196989 A1 | 10/2004 | Friedman et al. |
| 2004/0263636 A1 | 12/2004 | Cutler et al. |
| 2005/0008179 A1 | 1/2005 | Quinn |
| 2005/0025263 A1 | 2/2005 | Wu |
| 2005/0027520 A1 | 2/2005 | Mattila et al. |
| 2005/0049857 A1 | 3/2005 | Seltzer et al. |
| 2005/0049864 A1 | 3/2005 | Kaltenmeier et al. |
| 2005/0060142 A1 | 3/2005 | Visser et al. |
| 2005/0066279 A1 | 3/2005 | LeBarton et al. |
| 2005/0069162 A1 | 3/2005 | Haykin et al. |
| 2005/0075866 A1 | 4/2005 | Widrow |
| 2005/0114123 A1 | 5/2005 | Lukac et al. |
| 2005/0114128 A1 | 5/2005 | Hetherington et al. |
| 2005/0152559 A1 | 7/2005 | Gierl et al. |
| 2005/0152563 A1 | 7/2005 | Amada et al. |
| 2005/0185813 A1 | 8/2005 | Sinclair et al. |
| 2005/0203735 A1 | 9/2005 | Ichikawa |
| 2005/0213778 A1 | 9/2005 | Buck et al. |
| 2005/0216259 A1 | 9/2005 | Watts |
| 2005/0228518 A1 | 10/2005 | Watts |
| 2005/0238238 A1 | 10/2005 | Xu et al. |
| 2005/0240399 A1 | 10/2005 | Makinen |
| 2005/0261894 A1 | 11/2005 | Balan et al. |
| 2005/0276423 A1 | 12/2005 | Aubauer et al. |
| 2005/0288923 A1 | 12/2005 | Kok |
| 2006/0053007 A1 | 3/2006 | Niemisto |
| 2006/0058998 A1 | 3/2006 | Yamamoto et al. |
| 2006/0072768 A1 | 4/2006 | Schwartz et al. |
| 2006/0074646 A1 | 4/2006 | Alves et al. |
| 2006/0098809 A1 | 5/2006 | Nongpiur et al. |
| 2006/0120537 A1 | 6/2006 | Burnett et al. |
| 2006/0122832 A1 | 6/2006 | Takiguchi et al. |
| 2006/0133621 A1 | 6/2006 | Chen et al. |
| 2006/0136201 A1* | 6/2006 | Landron ............. H04M 1/6041 704/215 |
| 2006/0149535 A1 | 7/2006 | Choi et al. |
| 2006/0153391 A1 | 7/2006 | Hooley et al. |
| 2006/0160581 A1 | 7/2006 | Beaugeant et al. |
| 2006/0165202 A1 | 7/2006 | Thomas et al. |
| 2006/0184363 A1 | 8/2006 | McCree et al. |
| 2006/0206320 A1 | 9/2006 | Li |
| 2006/0222184 A1 | 10/2006 | Buck et al. |
| 2006/0224382 A1 | 10/2006 | Taneda |
| 2007/0021958 A1 | 1/2007 | Visser et al. |
| 2007/0027685 A1 | 2/2007 | Arakawa et al. |
| 2007/0033020 A1 | 2/2007 | (Kelleher) Francois et al. |
| 2007/0033032 A1* | 2/2007 | Schubert ................. G10L 15/22 704/235 |
| 2007/0041589 A1 | 2/2007 | Patel et al. |
| 2007/0055508 A1 | 3/2007 | Zhao et al. |
| 2007/0071206 A1 | 3/2007 | Gainsboro et al. |
| 2007/0078649 A1 | 4/2007 | Hetherington et al. |
| 2007/0094031 A1 | 4/2007 | Chen |
| 2007/0110263 A1 | 5/2007 | Brox |
| 2007/0116300 A1 | 5/2007 | Chen |
| 2007/0127668 A1 | 6/2007 | Ahya et al. |
| 2007/0136059 A1 | 6/2007 | Gadbois |
| 2007/0150268 A1 | 6/2007 | Acero et al. |
| 2007/0154031 A1 | 7/2007 | Avendano et al. |
| 2007/0165879 A1 | 7/2007 | Deng et al. |
| 2007/0195968 A1 | 8/2007 | Jaber |
| 2007/0230712 A1 | 10/2007 | Belt et al. |
| 2007/0230913 A1 | 10/2007 | Ichimura |
| 2007/0237339 A1 | 10/2007 | Konchitsky |
| 2007/0276656 A1 | 11/2007 | Solbach et al. |
| 2007/0294263 A1 | 12/2007 | Punj et al. |
| 2008/0019548 A1 | 1/2008 | Avendano |
| 2008/0033723 A1 | 2/2008 | Jang et al. |
| 2008/0059163 A1 | 3/2008 | Ding et al. |
| 2008/0071540 A1 | 3/2008 | Nakano et al. |
| 2008/0140391 A1 | 6/2008 | Yen et al. |
| 2008/0152157 A1 | 6/2008 | Lin et al. |
| 2008/0159507 A1 | 7/2008 | Virolainen et al. |
| 2008/0160977 A1 | 7/2008 | Ahmaniemi et al. |
| 2008/0170703 A1 | 7/2008 | Zivney |
| 2008/0192955 A1 | 8/2008 | Merks |
| 2008/0201138 A1 | 8/2008 | Visser et al. |
| 2008/0228474 A1 | 9/2008 | Huang et al. |
| 2008/0228478 A1 | 9/2008 | Hetherington et al. |
| 2008/0233934 A1 | 9/2008 | Diethorn |
| 2008/0259731 A1 | 10/2008 | Happonen |
| 2008/0260175 A1 | 10/2008 | Elko |
| 2008/0273476 A1 | 11/2008 | Cohen et al. |
| 2008/0298571 A1 | 12/2008 | Kurtz et al. |
| 2008/0304677 A1 | 12/2008 | Abolfathi et al. |
| 2008/0317259 A1 | 12/2008 | Zhang et al. |
| 2008/0317261 A1 | 12/2008 | Yoshida et al. |
| 2009/0012783 A1 | 1/2009 | Klein |
| 2009/0012786 A1 | 1/2009 | Zhang et al. |
| 2009/0034755 A1 | 2/2009 | Short et al. |

(56) References Cited

U.S. PATENT DOCUMENTS

| | | |
|---|---|---|
| 2009/0063142 A1 | 3/2009 | Sukkar |
| 2009/0089054 A1 | 4/2009 | Wang et al. |
| 2009/0116652 A1 | 5/2009 | Kirkeby et al. |
| 2009/0129610 A1 | 5/2009 | Kim et al. |
| 2009/0141908 A1 | 6/2009 | Jeong et al. |
| 2009/0144053 A1 | 6/2009 | Tamura et al. |
| 2009/0147942 A1 | 6/2009 | Culter |
| 2009/0150149 A1 | 6/2009 | Culter et al. |
| 2009/0154717 A1 | 6/2009 | Hoshuyama |
| 2009/0164905 A1 | 6/2009 | Ko |
| 2009/0177464 A1 | 7/2009 | Gao et al. |
| 2009/0220107 A1 | 9/2009 | Every et al. |
| 2009/0228272 A1 | 9/2009 | Herbig et al. |
| 2009/0240497 A1 | 9/2009 | Usher et al. |
| 2009/0245335 A1 | 10/2009 | Fang |
| 2009/0245444 A1 | 10/2009 | Fang |
| 2009/0253418 A1 | 10/2009 | Makinen |
| 2009/0264114 A1 | 10/2009 | Virolainen et al. |
| 2009/0271187 A1 | 10/2009 | Yen et al. |
| 2009/0292536 A1 | 11/2009 | Hetherington et al. |
| 2009/0323925 A1 | 12/2009 | Sweeney et al. |
| 2009/0323981 A1 | 12/2009 | Cutler |
| 2009/0323982 A1 | 12/2009 | Solbach et al. |
| 2010/0017205 A1 | 1/2010 | Visser et al. |
| 2010/0027799 A1 | 2/2010 | Romesburg et al. |
| 2010/0036659 A1 | 2/2010 | Haulick et al. |
| 2010/0082339 A1 | 4/2010 | Konchitsky et al. |
| 2010/0092007 A1 | 4/2010 | Sun |
| 2010/0094622 A1 | 4/2010 | Cardillo et al. |
| 2010/0103776 A1 | 4/2010 | Chan |
| 2010/0105447 A1 | 4/2010 | Sibbald et al. |
| 2010/0128123 A1 | 5/2010 | DiPoala |
| 2010/0130198 A1 | 5/2010 | Kannappan et al. |
| 2010/0138220 A1 | 6/2010 | Matsumoto et al. |
| 2010/0166199 A1 | 7/2010 | Seydoux |
| 2010/0177916 A1 | 7/2010 | Gerkmann et al. |
| 2010/0215184 A1 | 8/2010 | Buck et al. |
| 2010/0278352 A1 | 11/2010 | Petit et al. |
| 2010/0282045 A1 | 11/2010 | Chen et al. |
| 2010/0290615 A1 | 11/2010 | Takahashi |
| 2010/0303298 A1 | 12/2010 | Marks et al. |
| 2010/0309774 A1 | 12/2010 | Astrom |
| 2010/0315482 A1 | 12/2010 | Rosenfeld et al. |
| 2011/0019833 A1 | 1/2011 | Kuech et al. |
| 2011/0026734 A1 | 2/2011 | Hetherington et al. |
| 2011/0035213 A1 | 2/2011 | Malenovsky et al. |
| 2011/0060587 A1* | 3/2011 | Phillips .................. G10L 15/30 704/235 |
| 2011/0081026 A1 | 4/2011 | Ramakrishnan et al. |
| 2011/0091047 A1* | 4/2011 | Konchitsky .......... G10K 11/178 381/71.11 |
| 2011/0101654 A1 | 5/2011 | Cech |
| 2011/0123019 A1 | 5/2011 | Gowreesunker et al. |
| 2011/0178800 A1 | 7/2011 | Watts |
| 2011/0182436 A1 | 7/2011 | Murgia et al. |
| 2011/0261150 A1 | 10/2011 | Goyal et al. |
| 2011/0286605 A1 | 11/2011 | Furuta et al. |
| 2011/0300806 A1 | 12/2011 | Lindahl et al. |
| 2011/0305345 A1 | 12/2011 | Bouchard et al. |
| 2012/0010881 A1 | 1/2012 | Avendano et al. |
| 2012/0027217 A1 | 2/2012 | Jun et al. |
| 2012/0027218 A1 | 2/2012 | Every et al. |
| 2012/0050582 A1 | 3/2012 | Seshadri et al. |
| 2012/0062729 A1 | 3/2012 | Hart et al. |
| 2012/0063609 A1 | 3/2012 | Triki et al. |
| 2012/0087514 A1 | 4/2012 | Williams et al. |
| 2012/0093341 A1 | 4/2012 | Kim et al. |
| 2012/0116758 A1 | 5/2012 | Murgia et al. |
| 2012/0121096 A1 | 5/2012 | Chen et al. |
| 2012/0133728 A1 | 5/2012 | Lee |
| 2012/0140917 A1 | 6/2012 | Nicholson et al. |
| 2012/0143363 A1 | 6/2012 | Liu et al. |
| 2012/0179461 A1 | 7/2012 | Every et al. |
| 2012/0179462 A1 | 7/2012 | Klein |
| 2012/0182429 A1 | 7/2012 | Forutanpour et al. |
| 2012/0197898 A1 | 8/2012 | Pandey et al. |
| 2012/0220347 A1 | 8/2012 | Davidson |
| 2012/0237037 A1 | 9/2012 | Ninan et al. |
| 2012/0249785 A1 | 10/2012 | Sudo et al. |
| 2012/0250871 A1 | 10/2012 | Lu et al. |
| 2013/0011111 A1 | 1/2013 | Abraham et al. |
| 2013/0024190 A1 | 1/2013 | Fairey |
| 2013/0034243 A1 | 2/2013 | Yermeche et al. |
| 2013/0051543 A1 | 2/2013 | McDysan et al. |
| 2013/0096914 A1 | 4/2013 | Avendano et al. |
| 2013/0182857 A1 | 7/2013 | Namba et al. |
| 2013/0196715 A1* | 8/2013 | Hansson ................ H04M 1/19 455/563 |
| 2013/0231925 A1 | 9/2013 | Avendano et al. |
| 2013/0251170 A1 | 9/2013 | Every et al. |
| 2013/0268280 A1* | 10/2013 | Del Galdo .............. G10L 19/02 704/500 |
| 2013/0332156 A1 | 12/2013 | Tackin et al. |
| 2014/0039888 A1* | 2/2014 | Taubman ........... H04M 1/72572 704/235 |
| 2014/0098964 A1 | 4/2014 | Rosca et al. |
| 2014/0108020 A1* | 4/2014 | Sharma ................ G10L 19/018 704/500 |
| 2014/0112496 A1 | 4/2014 | Murgia et al. |
| 2014/0142958 A1* | 5/2014 | Sharma ................... G10L 19/02 704/500 |
| 2014/0241702 A1 | 8/2014 | Solbach et al. |
| 2014/0337016 A1* | 11/2014 | Herbig ...................... G06T 7/73 704/201 |
| 2015/0025881 A1 | 1/2015 | Carlos et al. |
| 2015/0030163 A1 | 1/2015 | Sokolov |
| 2015/0100311 A1* | 4/2015 | Kar ...................... G08G 5/0013 704/231 |
| 2015/0195647 A1* | 7/2015 | Srinivasan ............. H04R 3/002 381/71.4 |
| 2016/0066089 A1 | 3/2016 | Klein |

FOREIGN PATENT DOCUMENTS

| | | |
|---|---|---|
| EP | 1474755 A1 | 11/2004 |
| FI | 20080428 A | 7/2008 |
| FI | 20100431 A | 12/2010 |
| FI | 20125812 | 10/2012 |
| FI | 20135038 | 4/2013 |
| FI | 124716 | 12/2014 |
| JP | 62110349 | 5/1987 |
| JP | 4184400 B2 | 7/1992 |
| JP | 5053587 B2 | 3/1993 |
| JP | 6269083 | 9/1994 |
| JP | H07248793 | 9/1995 |
| JP | H10-313497 | 11/1998 |
| JP | H11-249693 | 9/1999 |
| JP | 2001159899 A | 6/2001 |
| JP | 2002366200 A | 12/2002 |
| JP | 2002542689 A | 12/2002 |
| JP | 2003514473 A | 4/2003 |
| JP | 2003271191 A | 9/2003 |
| JP | 2004187283 A | 7/2004 |
| JP | 2005110127 A | 4/2005 |
| JP | 2005518118 A | 6/2005 |
| JP | 2005195955 A | 7/2005 |
| JP | 2006094522 A | 4/2006 |
| JP | 2006337415 A | 12/2006 |
| JP | 2007006525 A | 1/2007 |
| JP | 2008015443 A | 1/2008 |
| JP | 2008135933 A | 6/2008 |
| JP | 2009522942 A | 6/2009 |
| JP | 2010053879 A | 10/2010 |
| JP | 2011527025 A | 10/2011 |
| JP | 5007442 B2 | 6/2012 |
| JP | 2013517531 A | 5/2013 |
| JP | 2013534651 A | 9/2013 |
| JP | 5762956 B2 | 6/2015 |
| KR | 1020080092404 | 10/2008 |
| KR | 1020100041741 | 4/2010 |
| KR | 1020110038024 | 4/2011 |
| KR | 1020120116442 | 10/2012 |
| KR | 101210313 B1 | 12/2012 |

(56) References Cited

FOREIGN PATENT DOCUMENTS

| KR | 1020130117750 | | 10/2013 |
|---|---|---|---|
| KR | 101461141 | B1 | 11/2014 |
| KR | 101610656 | B1 | 4/2016 |
| TW | 526468 | | 4/2003 |
| TW | 200305854 | A | 11/2003 |
| TW | 200629240 | | 8/2006 |
| TW | I279776 | | 4/2007 |
| TW | 200910793 | A | 3/2009 |
| TW | 201009817 | A | 3/2010 |
| TW | 201214418 | A | 4/2012 |
| TW | I463817 | | 12/2014 |
| TW | I465121 | | 12/2014 |
| TW | 201513099 | A | 4/2015 |
| TW | I488179 | | 6/2015 |
| WO | WO0137265 | | 5/2001 |
| WO | WO0141504 | A1 | 6/2001 |
| WO | WO0156328 | | 8/2001 |
| WO | WO0174118 | | 10/2001 |
| WO | WO03043374 | | 5/2003 |
| WO | WO03069499 | | 8/2003 |
| WO | WO2006027707 | A1 | 3/2006 |
| WO | WO2007001068 | A1 | 1/2007 |
| WO | WO2007049644 | A1 | 5/2007 |
| WO | WO2007081916 | A2 | 7/2007 |
| WO | WO2008045476 | A2 | 4/2008 |
| WO | WO2008101198 | A2 | 8/2008 |
| WO | WO2009008998 | A1 | 1/2009 |
| WO | WO2010005493 | A1 | 1/2010 |
| WO | WO2011091068 | A1 | 7/2011 |
| WO | WO2011129725 | A1 | 10/2011 |
| WO | WO2012009047 | A1 | 1/2012 |
| WO | WO2012097016 | A1 | 7/2012 |
| WO | WO2014063099 | A1 | 4/2014 |
| WO | WO2014131054 | A2 | 8/2014 |
| WO | WO2015010129 | A1 | 1/2015 |
| WO | WO2016033364 | A1 | 3/2016 |

OTHER PUBLICATIONS

Allen, Jont B. "Short Term Spectral Analysis, Synthesis, and Modification by Discrete Fourier Transform", IEEE Transactions on Acoustics, Speech, and Signal Processing. vol. ASSP-25, No. 3, Jun. 1977. pp. 235-238.

Allen, Jont B. et al., "A Unified Approach to Short-Time Fourier Analysis and Synthesis", Proceedings of the IEEE. vol. 65, No. 11, Nov. 1977. pp. 1558-1564.

Avendano, Carlos, "Frequency-Domain Source Identification and Manipulation in Stereo Mixes for Enhancement, Suppression and Re-Panning Applications," 2003 IEEE Workshop on Application of Signal Processing to Audio and Acoustics, Oct. 19-22, pp. 55-58, New Paltz, New York, USA.

Boll, Steven F. "Suppression of Acoustic Noise in Speech using Spectral Subtraction", IEEE Transactions on Acoustics, Speech and Signal Processing, vol. ASSP-27, No. 2, Apr. 1979, pp. 113-120.

Boll, Steven F. et al., "Suppression of Acoustic Noise in Speech Using Two Microphone Adaptive Noise Cancellation", IEEE Transactions on Acoustic, Speech, and Signal Processing, vol. ASSP-28, No. 6, Dec. 1980, pp. 752-753.

Boll, Steven F. "Suppression of Acoustic Noise in Speech Using Spectral Subtraction", Dept. of Computer Science, University of Utah Salt Lake City, Utah, Apr. 1979, pp. 18-19.

Chen, Jingdong et al., "New Insights into the Noise Reduction Wiener Filter", IEEE Transactions on Audio, Speech, and Language Processing. vol. 14, No. 4, Jul. 2006, pp. 1218-1234.

Cohen, Israel et al., "Microphone Array Post-Filtering for Non-Stationary Noise Suppression", IEEE International Conference on Acoustics, Speech, and Signal Processing, May 2002, pp. 1-4.

Cohen, Israel, "Multichannel Post-Filtering in Nonstationary Noise Environments", IEEE Transactions on Signal Processing, vol. 52, No. 5, May 2004, pp. 1149-1160.

Dahl, Mattias et al., "Simultaneous Echo Cancellation and Car Noise Suppression Employing a Microphone Array", 1997 IEEE International Conference on Acoustics, Speech, and Signal Processing, Apr. 21-24, pp. 239-242.

Elko, Gary W., "Chapter 2: Differential Microphone Arrays", "Audio Signal Processing for Next-Generation Multimedia Communication Systems", 2004, pp. 12-65, Kluwer Academic Publishers, Norwell, Massachusetts, USA.

"ENT 172." Instructional Module. Prince George's Community College Department of Engineering Technology. Accessed: Oct. 15, 2011. Subsection: "Polar and Rectangular Notation". <http://academic.ppgcc.edu/ent/ent172_instr_mod.html>.

Fuchs, Martin et al., "Noise Suppression for Automotive Applications Based on Directional Information", 2004 IEEE International Conference on Acoustics, Speech, and Signal Processing, May 17-21, pp. 237-240.

Fulghum, D. P. et al., "LPC Voice Digitizer with Background Noise Suppression", 1979 IEEE International Conference on Acoustics, Speech, and Signal Processing, pp. 220-223.

Goubran, R.A. et al., "Acoustic Noise Suppression Using Regressive Adaptive Filtering", 1990 IEEE 40th Vehicular Technology Conference, May 6-9, pp. 48-53.

Graupe, Daniel et al., "Blind Adaptive Filtering of Speech from Noise of Unknown Spectrum Using a Virtual Feedback Configuration", IEEE Transactions on Speech and Audio Processing, Mar. 2000, vol. 8, No. 2, pp. 146-158.

Haykin, Simon et al., "Appendix A.2 Complex Numbers." Signals and Systems. 2nd Ed. 2003. p. 764.

Hermansky, Hynek "Should Recognizers Have Ears?", In Proc. ESCA Tutorial and Research Workshop on Robust Speech Recognition for Unknown Communication Channels, pp. 1-10, France 1997.

Hohmann, V. "Frequency Analysis and Synthesis Using a Gammatone Filterbank", ACTA Acustica United with Acustica, 2002, vol. 88, pp. 433-442.

Jeffress, Lloyd A. et al., "A Place Theory of Sound Localization," Journal of Comparative and Physiological Psychology, 1948, vol. 41, p. 35-39.

Jeong, Hyuk et al., "Implementation of a New Algorithm Using the STFT with Variable Frequency Resolution for the Time-Frequency Auditory Model", J. Audio Eng. Soc., Apr. 1999, vol. 47, No. 4., pp. 240-251.

Kates, James M. "A Time-Domain Digital Cochlear Model", IEEE Transactions on Signal Processing, Dec. 1991, vol. 39, No. 12, pp. 2573-2592.

Kato et al., "Noise Suppression with High Speech Quality Based on Weighted Noise Estimation and MMSE STSA" Proc. IWAENC [Online] 2001, pp. 183-186.

Lazzaro, John et al., "A Silicon Model of Auditory Localization," Neural Computation Spring 1989, vol. 1, pp. 47-57, Massachusetts Institute of Technology.

Lippmann, Richard P. "Speech Recognition by Machines and Humans", Speech Communication, Jul. 1997, vol. 22, No. 1, pp. 1-15.

Liu, Chen et al., "A Two-Microphone Dual Delay-Line Approach for Extraction of a Speech Sound in the Presence of Multiple Interferers", Journal of the Acoustical Society of America, vol. 110, No. 6, Dec. 2001, pp. 3218-3231.

Martin, Rainer et al., "Combined Acoustic Echo Cancellation, Dereverberation and Noise Reduction: A two Microphone Approach", Annales des Telecommunications/Annals of Telecommunications. vol. 49, No. 7-8, Jul.-Aug. 1994, pp. 429-438.

Martin, Rainer "Spectral Subtraction Based on Minimum Statistics", in Proceedings Europe. Signal Processing Conf., 1994, pp. 1182-1185.

Mitra, Sanjit K. Digital Signal Processing: a Computer-based Approach. 2nd Ed. 2001. pp. 131-133.

Mizumachi, Mitsunori et al., "Noise Reduction by Paired-Microphones Using Spectral Subtraction", 1998 IEEE International Conference on Acoustics, Speech and Signal Processing, May 12-15. pp. 1001-1004.

(56) References Cited

OTHER PUBLICATIONS

Moonen, Marc et al., "Multi-Microphone Signal Enhancement Techniques for Noise Suppression and Dereverbration," http://www.esat.kuleuven.ac.be/sista/yearreport97//node37.html, accessed on Apr. 21, 1998.

Watts, Lloyd Narrative of Prior Disclosure of Audio Display on Feb. 15, 2000 and May 31, 2000.

Cosi, Piero et al., (1996), "Lyon's Auditory Model Inversion: a Tool for Sound Separation and Speech Enhancement," Proceedings of ESCA Workshop on 'The Auditory Basis of Speech Perception,' Keele University, Keele (UK), Jul. 15-19, 1996, pp. 194-197.

Parra, Lucas et al., "Convolutive Blind Separation of Non-Stationary Sources", IEEE Transactions on Speech and Audio Processing. vol. 8, No. 3, May 2008, pp. 320-327.

Rabiner, Lawrence R. et al., "Digital Processing of Speech Signals", (Prentice-Hall Series in Signal Processing). Upper Saddle River, NJ: Prentice Hall, 1978.

Weiss, Ron et al., "Estimating Single-Channel Source Separation Masks: Revelance Vector Machine Classifiers vs. Pitch-Based Masking", Workshop on Statistical and Perceptual Audio Processing, 2006.

Schimmel, Steven et al., "Coherent Envelope Detection for Modulation Filtering of Speech," 2005 IEEE International Conference on Acoustics, Speech, and Signal Processing, vol. 1, No. 7, pp. 221-224.

Slaney, Malcom, "Lyon's Cochlear Model", Advanced Technology Group, Apple Technical Report #13, Apple computer, Inc., 1988, pp. 1-79.

Slaney, Malcom, et al., "Auditory Model Inversion for Sound Separation," 1994 IEEE International Conference on Acoustics, Speech and Signal Processing, Apr. 19-22, vol. 2, pp. 77-80.

Slaney, Malcom. "An Introduction to Auditory Model Inversion", Interval Technical Report IRC 1994-014, http://coweb.ecn.purdue.edu/~maclom/interval/1994-014/, Sep. 1994, accessed on Jul. 6, 2010.

Solbach, Ludger "An Architecture for Robust Partial Tracking and Onset Localization in Single Channel Audio Signal Mixes", Technical University Hamburg-Harburg, 1998.

Soon et al., "Low Distortion Speech Enhancement" Proc. Inst. Elect. Eng. [Online] 2000, vol. 147, pp. 247-253.

Stahl, V. et al., "Quantile Based Noise Estimation for Spectral Subtraction and Wiener Filtering," 2000 IEEE International Conference on Acoustics, Speech, and Signal Processing, Jun. 5-9, vol. 3, pp. 1875-1878.

Syntrillium Software Corporation, "Cool Edit User's Manual", 1996, pp. 1-74.

Tashev, Ivan et al., "Microphone Array for Headset with Spatial Noise Suppressor", http://research.microsoft.com/users/ivantash/Documents/Tashev_MAforHeadset_HSCMA_05.pdf. (4 pages).

Tchorz, Jurgen et al., "SNR Estimation Based on Amplitude Modulation Analysis with Applications to Noise Suppression", IEEE Transactions on Speech and Audio Processing, vol. 11, No. 3, May 2003, pp. 184-192.

Valin, Jean-Marc et al., "Enhanced Robot Audition Based on Microphone Array Source Separation with Post-Filter", Proceedings of 2004 IEEE/RSJ International Conference on Intelligent Robots and Systems, Sep. 28-Oct. 2, 2004, Sendai, Japan. pp. 2123-2128.

Watts, Lloyd, "Robust Hearing Systems for Intelligent Machines," Applied Neurosystems Corporation, 2001, pp. 1-5.

Widrow, B. et al., "Adaptive Antenna Systems," Proceedings of the IEEE, vol. 55, No. 12, pp. 2143-2159, Dec. 1967.

Yoo, Heejong et al., "Continuous-Time Audio Noise Suppression and Real-Time Implementation", 2002 IEEE International Conference on Acoustics, Speech, and Signal Processing, May 13-17, pp. IV3980-IV3983.

International Search Report dated Jun. 8, 2001 in Patent Cooperation Treaty Application No. PCT/US2001/008372.

International Search Report dated Apr. 3, 2003 in Patent Cooperation Treaty Application No. PCT/US2002/036946.

International Search Report dated May 29, 2003 in Patent Cooperation Treaty Application No. PCT/US2003/004124.

International Search Report and Written Opinion dated Oct. 19, 2007 in Patent Cooperation Treaty Application No. PCT/US2007/000463.

International Search Report and Written Opinion dated Apr. 9, 2008 in Patent Cooperation Treaty Application No. PCT/US2007/021654.

International Search Report and Written Opinion dated Sep. 16, 2008 in Patent Cooperation Treaty Application No. PCT/US2007/012628.

International Search Report and Written Opinion dated Oct. 1, 2008 in Patent Cooperation Treaty Application No. PCT/US2008/008249.

International Search Report and Written Opinion dated Aug. 27, 2009 in Patent Cooperation Treaty Application No. PCT/US2009/003813.

Dahl, Mattias et al., "Acoustic Echo and Noise Cancelling Using Microphone Arrays", International Symposium on Signal Processing and its Applications, ISSPA, Gold coast, Australia, Aug. 25-30, 1996, pp. 379-382.

Demol, M. et al., "Efficient Non-Uniform Time-Scaling of Speech With WSOLA for CALL Applications", Proceedings of InSTIL/ICALL2004—NLP and Speech Technologies in Advanced Language Learning Systems—Venice Jun. 17-19, 2004.

Laroche, Jean. "Time and Pitch Scale Modification of Audio Signals", in "Applications of Digital Signal Processing to Audio and Acoustics", The Kluwer International Series in Engineering and Computer Science, vol. 437, pp. 279-309, 2002.

Moulines, Eric et al., "Non-Parametric Techniques for Pitch-Scale and Time-Scale Modification of Speech", Speech Communication, vol. 16, pp. 175-205, 1995.

Verhelst, Werner, "Overlap-Add Methods for Time-Scaling of Speech", Speech Communication vol. 30, pp. 207-221, 2000.

Bach et al., Learning Spectral Clustering with application to spech separation, Journal of machine learning research, 2006.

Mokbel et al., 1995, IEEE Transactions of Speech and Audio Processing, vol. 3, No. 5, Sep. 1995, pp. 346-356.

Office Action mailed Oct. 14, 2013 in Taiwanese Patent Application 097125481, filed Jul. 4, 2008.

Office Action mailed Oct. 29, 2013 in Japanese Patent Application 2011-516313, filed Jun. 26, 2009.

Office Action mailed Dec. 20, 2013 in Taiwanese Patent Application 096146144, filed Dec. 4, 2007.

Office Action mailed Dec. 9, 2013 in Finnish Patent Application 20100431, filed Jun. 26, 2009.

Office Action mailed Jan. 20, 2014 in Finnish Patent Application 20100001, filed Jul. 3, 2008.

Office Action mailed Mar. 10, 2014 in Taiwanese Patent Application 097125481, filed Jul. 4, 2008.

Bai et al., "Upmixing and Downmixing Two-channel Stereo Audio for Consumer Electronics". IEEE Transactions on Consumer Electronics [Online] 2007, vol. 53, Issue 3, pp. 1011-1019.

Jo et al., "Crosstalk cancellation for spatial sound reproduction in portable devices with stereo loudspeakers". Communications in Computer and Information Science [Online] 2011, vol. 266, pp. 114-123.

Nongpuir et al., "NEXT cancellation system with improved convergence rate and tracking performance". IEEE Proceedings—Communications [Online] 2005, vol. 152, Issue 3, pp. 378-384.

Ahmed et al., "Blind Crosstalk Cancellation for DMT Systems" IEEE—Emergent Technologies Technical Committee. Sep. 2001. pp. 1-5.

Allowance mailed May 21, 2014 in Finnish Patent Application 20100001, filed Jan. 4, 2010.

Office Action mailed May 2, 2014 in Taiwanese Patent Application 098121933, filed Jun. 29, 2009.

Office Action mailed Apr. 15, 2014 in Japanese Patent Application 2010-514871, filed Jul. 3, 2008.

Elhilali et al.,"A cocktail party with a cortical twist: How cortical mechanisms contribute to sound segregation." J Acoust Soc Am. Dec. 2008; 124(6): 3751-3771).

(56) References Cited

OTHER PUBLICATIONS

Jin et al., "HMM-Based Multipitch Tracking for Noisy and Reverberant Speech."
Kawahara, W, et al., "Tandem-Straight: A temporally stable power spectral representation for periodic signals and applications to interference-free spectrum, F0, and aperiodicity estimation." IEEE ICASSP 2008.
Office Action mailed Jun. 27, 2014 in Korean Patent Application No. 10-2010-7000194, filed Jan. 6, 2010.
Office Action mailed Jun. 18, 2014 in Finnish Patent Application No. 20080428, filed Jul. 4, 2008.
International Search Report & Written Opinion dated Jul. 15, 2014 in Patent Cooperation Treaty Application No. PCT/US2014/018443, filed Feb. 25, 2014.
Notice of Allowance dated Aug. 26, 2014 in Taiwanese Application No. 096146144, filed Dec. 4, 2007.
Notice of Allowance dated Sep. 16, 2014 in Korean Application No. 10-2010-7000194, filed Jul. 3, 2008.
Notice of Allowance dated Sep. 29, 2014 in Taiwanese Application No. 097125481, filed Jul. 4, 2008.
Notice of Allowance dated Oct. 10, 2014 in Finnish Application No. 20100001, filed Jul. 3, 2008.
International Search Report & Written Opinion dated Nov. 12, 2014 in Patent Cooperation Treaty Application No. PCT/US2014/047458, filed Jul. 21, 2014.
Office Action mailed Oct. 28, 2014 in Japanese Patent Application No. 2011-516313, filed Dec. 27, 2012.
Heiko Purnhagen, "Low Complexity Parametric Stereo Coding in MPEG-4," Proc. of the 7th Int. Conference on Digital Audio Effects (DAFx'04), Naples, Italy, Oct. 5-8, 2004.
Chun-Ming Chang et al., "Voltage-Mode Multifunction Filter with Single Input and Three Outputs Using Two Compound Current Conveyors" IEEE Transactions on Circuits and Systems-I: Fundamental Theory and Applications, vol. 46, No. 11, Nov. 1999.
Notice of Allowance mailed Feb. 10, 2015 in Taiwanese Patent Application No. 098121933, filed Jun. 29, 2009.
Office Action mailed Jan. 30, 2015 in Finnish Patent Application No. 20080623, filed May 24, 2007.
Office Action mailed Mar. 24, 2015 in Japanese Patent Application No. 2011-516313, filed Jun. 26, 2009.
Office Action mailed Apr. 16, 2015 in Korean Patent Application No. 10-2011-7000440, filed Jun. 26, 2009.
Notice of Allowance mailed Jun. 2, 2015 in Japanese Patent Application 2011-516313, filed Jun. 26, 2009.
Office Action mailed Jun. 4, 2015 in Finnish Patent Application 20080428, filed Jan. 5, 2007.
Office Action mailed Jun. 9, 2015 in Japanese Patent Application 2014-165477 filed Jul. 3, 2008.
Notice of Allowance mailed Aug. 13, 2015 in Finnish Patent Application 20080623, filed May 24, 2007.
Non-Final Office Action, Oct. 27, 2003, U.S. Appl. No. 09/534,682, filed Mar. 24, 2000.
Non-Final Office Action, Feb. 10, 2004, U.S. Appl. No. 09/534,682, filed Mar. 24, 2000.
Final Office Action, Dec. 17, 2004, U.S. Appl. No. 09/534,682, filed Mar. 24, 2000.
Non-Final Office Action, Apr. 20, 2005, U.S. Appl. No. 09/534,682, filed Mar. 24, 2000.
Notice of Allowance, Oct. 26, 2005, U.S. Appl. No. 09/534,682, filed Mar. 24, 2000.
Non-Final Office Action, May 3, 2005, U.S. Appl. No. 09/993,442, filed Nov. 13, 2001.
Final Office Action, Oct. 19, 2005, U.S. Appl. No. 09/993,442, filed Nov. 13, 2001.
Advisory Action, Jan. 20, 2006, U.S. Appl. No. 09/993,442, filed Nov. 13, 2001.
Non-Final Office Action, May 17, 2006, U.S. Appl. No. 09/993,442, filed Nov. 13, 2001.
Non-Final Office Action, Nov. 16, 2006, U.S. Appl. No. 09/993,442, filed Nov. 13, 2001.
Final Office Action, Jun. 15, 2007, U.S. Appl. No. 09/993,442, filed Nov. 13, 2001.
Non-Final Office Action, Oct. 8, 2003, U.S. Appl. No. 10/004,141, filed Nov. 14, 2001.
Notice of Allowance, Feb. 24, 2004, U.S. Appl. No. 10/004,141, filed Nov. 14, 2001.
Non-Final Office Action, May 9, 2003, U.S. Appl. No. 10/074,991, filed Feb. 13, 2002.
Notice of Allowance, Jun. 4, 2003, U.S. Appl. No. 10/074,991, filed Feb. 13, 2002.
Non-Final Office Action, Jun. 26, 2006, U.S. Appl. No. 10/074,991, filed Feb. 13, 2002.
Final Office Action, Feb. 23, 2007, U.S. Appl. No. 10/074,991, filed Feb. 13, 2002.
Non-Final Office Action, Oct. 6, 2005, U.S. Appl. No. 10/177,049, filed Jun. 21, 2002.
Final Office Action, Mar. 28, 2006, U.S. Appl. No. 10/177,049, filed Jun. 21, 2002.
Advisory Action, Jun. 19, 2006, U.S. Appl. No. 10/177,049, filed Jun. 21, 2002.
Non-Final Office Action, Dec. 13, 2006, U.S. Appl. No. 10/613,224, filed Jul. 3, 2003.
Non-Final Office Action, Jun. 13, 2007, U.S. Appl. No. 10/613,224, filed Jul. 3, 2003.
Non-Final Office Action, Jun. 13, 2006, U.S. Appl. No. 10/840,201, filed May 5, 2004.
Non-Final Office Action, Mar. 30, 2010, U.S. Appl. No. 11/343,524, filed Jan. 30, 2006.
Non-Final Office Action, Sep. 13, 2010, U.S. Appl. No. 11/343,524, filed Jan. 30, 2006.
Final Office Action, Mar. 30, 2011, U.S. Appl. No. 11/343,524, filed Jan. 30, 2006.
Final Office Action, May 21, 2012, U.S. Appl. No. 11/343,524, filed Jan. 30, 2006.
Notice of Allowance, Oct. 9, 2012, U.S. Appl. No. 11/343,524, filed Jan. 30, 2006.
Non-Final Office Action, Aug. 5, 2008, U.S. Appl. No. 11/441,675, filed May 25, 2006.
Non-Final Office Action, Jan. 21, 2009, U.S. Appl. No. 11/441,675, filed May 25, 2006.
Final Office Action, Sep. 3, 2009, U.S. Appl. No. 11/441,675, filed May 25, 2006.
Non-Final Office Action, May 10, 2011, U.S. Appl. No. 11/441,675, filed May 25, 2006.
Final Office Action, Oct. 24, 2011, U.S. Appl. No. 11/441,675, filed May 25, 2006.
Notice of Allowance, Feb. 13, 2012, U.S. Appl. No. 11/441,675, filed May 25, 2006.
Non-Final Office Action, Apr. 7, 2011, U.S. Appl. No. 11/699,732, filed Jan. 29, 2007.
Final Office Action, Dec. 6, 2011, U.S. Appl. No. 11/699,732, filed Jan. 29, 2007.
Advisory Action, Feb. 14, 2012, U.S. Appl. No. 11/699,732, filed Jan. 29, 2007.
Notice of Allowance, Mar. 15, 2012, U.S. Appl. No. 11/699,732, filed Jan. 29, 2007.
Non-Final Office Action, Aug. 18, 2010, U.S. Appl. No. 11/825,563, filed Jul. 6, 2007.
Final Office Action, Apr. 28, 2011, U.S. Appl. No. 11/825,563, filed Jul. 6, 2007.
Non-Final Office Action, Apr. 24, 2013, U.S. Appl. No. 11/825,563, filed Jul. 6, 2007.
Final Office Action, Dec. 30, 2013, U.S. Appl. No. 11/825,563, filed Jul. 6, 2007.
Notice of Allowance, Mar. 25, 2014, U.S. Appl. No. 11/825,563, filed Jul. 6, 2007.
Non-Final Office Action, Oct. 3, 2011, U.S. Appl. No. 12/004,788, filed Dec. 21, 2007.
Notice of Allowance, Feb. 23, 2012, U.S. Appl. No. 12/004,788, filed Dec. 21, 2007.
Non-Final Office Action, Sep. 14, 2011, U.S. Appl. No. 12/004,897, filed Dec. 21, 2007.

(56) References Cited

OTHER PUBLICATIONS

Notice of Allowance, Jan. 27, 2012, U.S. Appl. No. 12/004,897, filed Dec. 21, 2007.
Non-Final Office Action, Jul. 28, 2011, U.S. Appl. No. 12/072,931, filed Feb. 29, 2008.
Notice of Allowance, Mar. 1, 2012, U.S. Appl. No. 12/072,931, filed Feb. 29, 2008.
Notice of Allowance, Mar. 1, 2012, U.S. Appl. No. 12/080,115, filed Mar. 31, 2008.
Non-Final Office Action, Nov. 14, 2011, U.S. Appl. No. 12/215,980, filed Jun. 30, 2008.
Final Office Action, Apr. 24, 2012, U.S. Appl. No. 12/215,980, filed Jun. 30, 2008.
Advisory Action, Jul. 3, 2012, U.S. Appl. No. 12/215,980, filed Jun. 30, 2008.
Non-Final Office Action, Mar. 11, 2014, U.S. Appl. No. 12/215,980, filed Jun. 30, 2008.
Final Office Action, Jul. 11, 2014, U.S. Appl. No. 12/215,980, filed Jun. 30, 2008.
Non-Final Office Action, Dec. 8, 2014, U.S. Appl. No. 12/215,980, filed Jun. 30, 2008.
Notice of Allowance, Jul. 7, 2015, U.S. Appl. No. 12/215,980, filed Jun. 30, 2008.
Non-Final Office Action, Jul. 13, 2011, U.S. Appl. No. 12/217,076, filed Jun. 30, 2008.
Final Office Action, Nov. 16, 2011, U.S. Appl. No. 12/217,076, filed Jun. 30, 2008.
Non-Final Office Action, Mar. 14, 2012, U.S. Appl. No. 12/217,076, filed Jun. 30, 2008.
Final Office Action, Sep. 19, 2012, U.S. Appl. No. 12/217,076, filed Jun. 30, 2008.
Notice of Allowance, Apr. 15, 2013, U.S. Appl. No. 12/217,076, filed Jun. 30, 2008.
Non-Final Office Action, Sep. 1, 2011, U.S. Appl. No. 12/286,909, filed Oct. 2, 2008.
Notice of Allowance, Feb. 28, 2012, U.S. Appl. No. 12/286,909, filed Oct. 2, 2008.
Non-Final Office Action, Nov. 15, 2011, U.S. Appl. No. 12/286,995, filed Oct. 2, 2008.
Final Office Action, Apr. 10, 2012, U.S. Appl. No. 12/286,995, filed Oct. 2, 2008.
Notice of Allowance, Mar. 13, 2014, U.S. Appl. No. 12/286,995, filed Oct. 2, 2008.
Non-Final Office Action, Dec. 28, 2011, U.S. Appl. No. 12/288,228, filed Oct. 16, 2008.
Non-Final Office Action, Dec. 30, 2011, U.S. Appl. No. 12/422,917, filed Apr. 13, 2009.
Final Office Action, May 14, 2012, U.S. Appl. No. 12/422,917, filed Apr. 13, 2009.
Advisory Action, Jul. 27, 2012, U.S. Appl. No. 12/422,917, filed Apr. 13, 2009.
Notice of Allowance, Sep. 11, 2014, U.S. Appl. No. 12/422,917, filed Apr. 13, 2009.
Non-Final Office Action, Jun. 20, 2012, U.S. Appl. No. 12/649,121, filed Dec. 29, 2009.
Final Office Action, Nov. 28, 2012, U.S. Appl. No. 12/649,121, filed Dec. 29, 2009.
Advisory Action, Feb. 19, 2013, U.S. Appl. No. 12/649,121, filed Dec. 29, 2009.
Notice of Allowance, Mar. 19, 2013, U.S. Appl. No. 12/649,121, filed Dec. 29, 2009.
Non-Final Office Action, Feb. 19, 2013, U.S. Appl. No. 12/944,659, filed Nov. 11, 2010.
Notice of Allowance, May 25, 2011, U.S. Appl. No. 13/016,916, filed Jan. 28, 2011.
Notice of Allowance, Aug. 4, 2011, U.S. Appl. No. 13/016,916, filed Jan. 28, 2011.
Non-Final Office Action, Nov. 22, 2013, U.S. Appl. No. 13/363,362, filed Jan. 31, 2012.
Final Office Action, Sep. 12, 2014, U.S. Appl. No. 13/363,362, filed Jan. 31, 2012.
Non-Final Office Action, Oct. 28, 2015, U.S. Appl. No. 13/363,362, filed Jan. 31, 2012.
Non-Final Office Action, Dec. 4, 2013, U.S. Appl. No. 13/396,568, filed Feb. 14, 2012.
Final Office Action, Sep. 23, 2014, U.S. Appl. No. 13/396,568, filed Feb. 14, 2012.
Non-Final Office Action, Nov. 5, 2015, U.S. Appl. No. 13/396,568, filed Feb. 14, 2012.
Non-Final Office Action, Sep. 17, 2013, U.S. Appl. No. 13/397,597, filed Feb. 15, 2012.
Final Office Action, Apr. 1, 2014, U.S. Appl. No. 13/397,597, filed Feb. 15, 2012.
Non-Final Office Action, Nov. 21, 2014, U.S. Appl. No. 13/397,597, filed Feb. 15, 2012.
Non-Final Office Action, Jun. 7, 2012, U.S. Appl. No. 13/426,436, filed Mar. 21, 2012.
Final Office Action, Dec. 31, 2012, U.S. Appl. No. 13/426,436, filed Mar. 21, 2012.
Non-Final Office Action, Sep. 12, 2013, U.S. Appl. No. 13/426,436, filed Mar. 21, 2012.
Notice of Allowance, Jul. 16, 2014, U.S. Appl. No. 13/426/,436, filed Mar. 21, 2012.
Non-Final Office Action, Jul. 15, 2014, U.S. Appl. No. 13/432,490, filed Mar. 28, 2012.
Notice of Allowance, Apr. 3, 2015, U.S. Appl. No. 13/432,490, filed Mar. 28, 2012.
Notice of Allowance, Oct. 17, 2012, U.S. Appl. No. 13/565,751, filed Aug. 2, 2012.
Non-Final Office Action, Jan. 9, 2012, U.S. Appl. No. 13/664,299, filed Oct. 30, 2012.
Non-Final Office Action, Dec. 28, 2012, U.S. Appl. No. 13/664,299, filed Oct. 30, 2012.
Non-Final Office Action, Mar. 7, 2013, U.S. Appl. No. 13/664,299, filed Oct. 30, 2012.
Final Office Action, Apr. 29, 2013, U.S. Appl. No. 13/664,299, filed Oct. 30, 2012.
Non-Final Office Action, Nov. 27, 2013, U.S. Appl. No. 13/664,299, filed Oct. 30, 2012.
Notice of Allowance, Jan. 30, 2014, U.S. Appl. No. 13/664,299, filed Oct. 30, 2012.
Non-Final Office Action, Jun. 4, 2013, U.S. Appl. No. 13/705,132, filed Dec. 4, 2012.
Final Office Action, Dec. 19, 2013, U.S. Appl. No. 13/705,132, filed Dec. 4, 2012.
Notice of Allowance, Jun. 19, 2014, U.S. Appl. No. 13/705,132, filed Dec. 4, 2012.
Non-Final Office Action, Jul. 14, 2015, U.S. Appl. No. 14/046,551, filed Oct. 4, 2013.
Non-Final Office Action, May 21, 2015, U.S. Appl. No. 14/189,817, filed Feb. 25, 2014.
Final Office Action, Dec. 15, 2015, U.S. Appl. No. 14/189,817, filed Feb. 25, 2014.
Notice of Allowance, Oct. 7, 2014, U.S. Appl. No. 14/207,096, filed Mar. 12, 2014.
Non-Final Office Action, Oct. 28, 2015, U.S. Appl. No. 14/216,567, filed Mar. 17, 2014.
Non-Final Office Action, Jul. 10, 2014, U.S. Appl. No. 14/279,092, filed May 15, 2014.
Notice of Allowance, Jan. 29, 2015, U.S. Appl. No. 14/279,092, filed May 15, 2014.
Non-Final Office Action, Feb. 27, 2015, U.S. Appl. No. 14/336,934, filed Jul. 21, 2014.
Notice of Allowance, Aug. 28, 2015, U.S. Appl. No. 14/336,934, filed Jul. 21, 2014.
International Search Report and Written Opinion dated Sep. 1, 2011 in Patent Cooperation Treaty Application No. PCT/US11/37250.
Fazel et al., "An overview of statistical pattern recognition techniques for speaker verification," IEEE, May 2011.
Sundaram et al., "Discriminating Two Types of Noise Sources Using Cortical Representation and Dimension Reduction Technique," IEEE, 2007.

(56) References Cited

OTHER PUBLICATIONS

Tognieri et al., "A Comparison of the LBG, LVQ, MLP, SOM and GMM Algorithms for Vector Quantisation and Clustering Analysis," University of Western Australia, 1992.
Klautau et al., "Discriminative Gaussian Mixture Models a Comparison with Kernel Classifiers," ICML, 2003.
International Search Report & Written Opinion dated Mar. 18, 2014 in Patent Cooperation Treaty Application No. PCT/US2013/065752, filed Oct. 18, 2013.
Kim et al., "Improving Speech Intelligibility in Noise Using Environment-Optimized Algorithms," IEEE Transactions on Audio, Speech, and Language Processing, vol. 18, No. 8, Nov. 2010, pp. 2080-2090.
Sharma et al., "Rotational Linear Discriminant Analysis Technique for Dimensionality Reduction," IEEE Transactions on Knowledge and Data Engineering, vol. 20, No. 10, Oct. 2008, pp. 1336-1347.
Temko et al., "Classifiation of Acoustic Events Using SVM-Based Clustering Schemes," Pattern Recognition 39, No. 4, 2006, pp. 682-694.
Office Action mailed Jun. 17, 2015 in Japan Patent Application 2013-519682 filed May 19, 2011.
Notice of Allowance dated Feb. 24, 2016 in Korean Application No. 10-2011-7000440, filed Jun. 26, 2009.
Hu et al., "Robust Speaker's Location Detection in a Vehicle Environment Using GMM Models," IEEE Transactions on Systems, Man, and Cybernetics—Part B: Cybernetics, vol. 36, No. 2, Apr. 2006, pp. 403-412.
Laroche, Jean et al., "Noise Suppression Assisted Automatic Speech Recognition", U.S. Appl. No. 12/962,519, filed Dec. 7, 2010.
Goodwin, Michael M. et al., "Key Click Suppression", U.S. Appl. No. 14/745,176, filed Jun. 19, 2015.

\* cited by examiner

MULTI-SOURCED NOISE SUPPRESSION

CROSS-REFERENCE TO RELATED APPLICATION

The present application claims the benefit of U.S. Provisional Application No. 62/043,344, filed on Aug. 28, 2014. The subject matter of the aforementioned application is incorporated herein by reference for all purposes.

FIELD

The present application relates generally to audio processing and, more specifically, to systems and methods for providing multi-sourced noise suppression.

BACKGROUND

Automatic Speech Recognition (ASR) and voice user interfaces (VUI) are widely used to control different type of devices, such as TV sets, game consoles, and the like. Usually, a user utters a voice command to control a device when the user is located in near proximity to the device, for example, in the same room as the device. However, such location may not be convenient if the user needs to provide a voice command for a device located in a different room, a garage, a different house, or another remote location. Moreover, the voice command can be unclear due to a noisy environment in which the device operates. Therefore, the device may not recognize the issued command. Accordingly, more robust systems and methods for delivering spoken commands to a device with a VUI interface may be desired.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Systems and methods for multi-sourced audio processing are described. An exemplary method for multi-sourced noise suppression comprises: assigning weights to audio streams, the audio streams being provided substantially synchronously by a plurality of audio devices, the weights depending on quality of the audio streams; processing, based on the weights, the audio streams to generate a cleaned voice signal; and providing the cleaned voice signal to at least one remote device for further processing. In some embodiments, each of the audio devices includes at least one microphone and is associated with the Internet of Things, also referred to herein as Internet of Things devices.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

The technology disclosed herein is directed to systems and methods for multi-sourced noise suppression, also referred to herein as crowd-based noise suppression. Various embodiments of the present technology may be practiced with a plurality of audio devices configured at least to capture acoustic signals. The audio device can include cellular phones, smartphones, wearables, tablets, phablets, video cameras, phone handsets, headsets, conferencing systems, and other devices having one or more microphones and the functionality to capture sounds. In some embodiments, the audio devices are devices that are connected or part of the Internet of Things (IoT), e.g., a dynamic network of globally connected devices, which may include devices not ordinarily considered audio devices, such as smart thermostats, smart appliances and the like.

In various embodiments, the audio devices further includes radio frequency (RF) receivers, transmitters and transceivers, wired and/or wireless telecommunications and/or networking devices, amplifiers, audio and/or video players, encoders, decoders, speakers, inputs, outputs, storage devices, and user input devices. The audio devices may also include input devices such as buttons, switches, keys, keyboards, trackballs, sliders, touch screens, one or more microphones, gyroscopes, accelerometers, global positioning system (GPS) receivers, and the like. The audio devices may also include outputs, such as LED indicators, video displays, touchscreens, speakers, and the like.

In various embodiments, the audio devices are operated in stationary and portable environments. Stationary environments include residential and commercial buildings or structures, and the like. For example, the stationary embodiments include living rooms, bedrooms, home theaters, conference rooms, auditoriums, business premises, and the like. Portable environments include moving vehicles, moving persons, transportation means, and the like.

The present technology may be used for providing remote commands to a device, such as a device located in a different part of the house, in a vehicle, or in another house. Additionally, the present technology may be used to enable live-talk communications (i.e., real-time communications with a second user located in a different part of the house or even in a different house). In some embodiments, the data is relayed to another device through a local wired or local wireless network (see e.g., network 140) or through a computing cloud 160.

Figure 1:
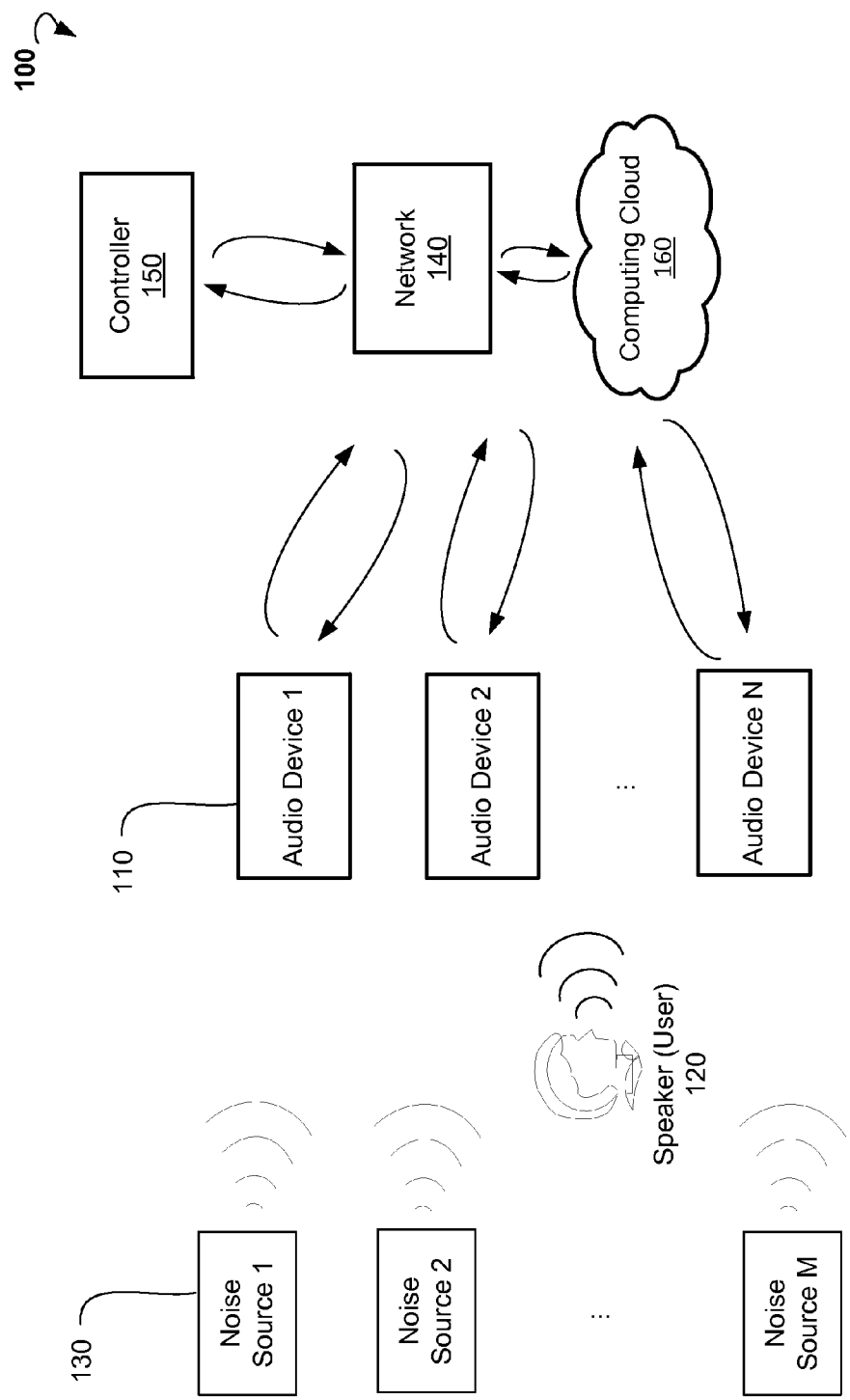
FIG. 1 is a block diagram illustrating an exemplary environment in which a method for multi-sourced noise suppression can be practiced.

FIG. 1 is a block diagram illustrating an environment 100 in which a method for multi-sourced noise suppression can be practiced, according to an exemplary embodiment. The example environment 100 includes one or more audio devices 110. The audio devices 110 may be located at different places inside a residence and/or office. Each of the audio devices 110 may be configured to receive acoustic signals, process the acoustic signal to generate an audio stream and send the audio stream to a remote device. In some embodiments, each of the audio devices 110 may include at least one microphone for capturing the acoustic sound. In various embodiments the acoustic signal may include a voice from a user 120 contaminated by one or more noise sources 130. Noise sources 130 may include street noise, ambient noise, and speech from entities other than an intended speaker 120. For example, noise sources 130 include working air conditioners, ventilation fans, street noise, TV sets, mobile phones, stereo audio systems, and the like.

In various embodiments, the audio devices 110 are interconnected via a network 140. In some embodiments, the network 140 includes a local network, for example a Wi-Fi network, a Bluetooth network, and the like. In addition or alternatively, the audio devices 110 may be interconnected via wired or mesh network. In some embodiments, the audio devices 110 may include a controller/coordinator 150, also referred to as "controller 150" herein. In certain embodiments, the audio devices 110 is synchronized to a common time source, provided either by an external device or the controller 150. The controller/coordinator 150 may be a router, a chip, one of the audio devices 110 (such as the TV set), and so forth. For example, if the audio devices 110 are interconnected via a wireless network, the router may act as the controller/coordinator 150.

In further embodiments, one or more of the audio devices 110 are connected to a cloud-based computing resource(s) 160, also referred to as "computing cloud 160", and "cloud-based computing resource services 160" herein. In some embodiments, the cloud-based computing resource includes one or more server farms/clusters including a collection of computer servers which may be co-located with network switches and/or routers. The cloud-based computing resource 160 may include an application that interconnects the audio devices 110 for data exchange between the audio devices 110, and applications for processing data received from the audio devices 110, controller 150, and other services.

In various embodiments, audio devices 110 constantly or periodically listening for voice and buffer audio data. The exemplary audio devices 110 communicate with each other via the network 140. In various embodiments, the audio devices are devices that are connected to or part of the Internet of Things. The exemplary audio devices 100 have one or more microphones for capturing sounds and may be connected to a network, e.g., the Internet. Such exemplary audio devices are also referred to herein as "Internet of Things devices" or "IoT devices". By way of example and not limitation, first and second audio devices 110 may be located at different distances from the speaker 120, also referred to herein as a the talker or user 120. The audio data captured by the first and second audio devices 110 may be provided to controller/coordinator 150 and treated as data coming from a primary microphone and a secondary microphone. With this information, the controller 150 may perform echo and noise suppression. For example, as the user 120 walks around the house, alternate audio devices 110 and microphones positioned throughout the house may become optimal for picking up speech from the user 120. When the user 120 speaks (for example, providing a voice command to an audio device 110), all listening audio devices 110 and microphones send their time-stamped data to the controller/coordinator 150 for further processing.

Figure 2:
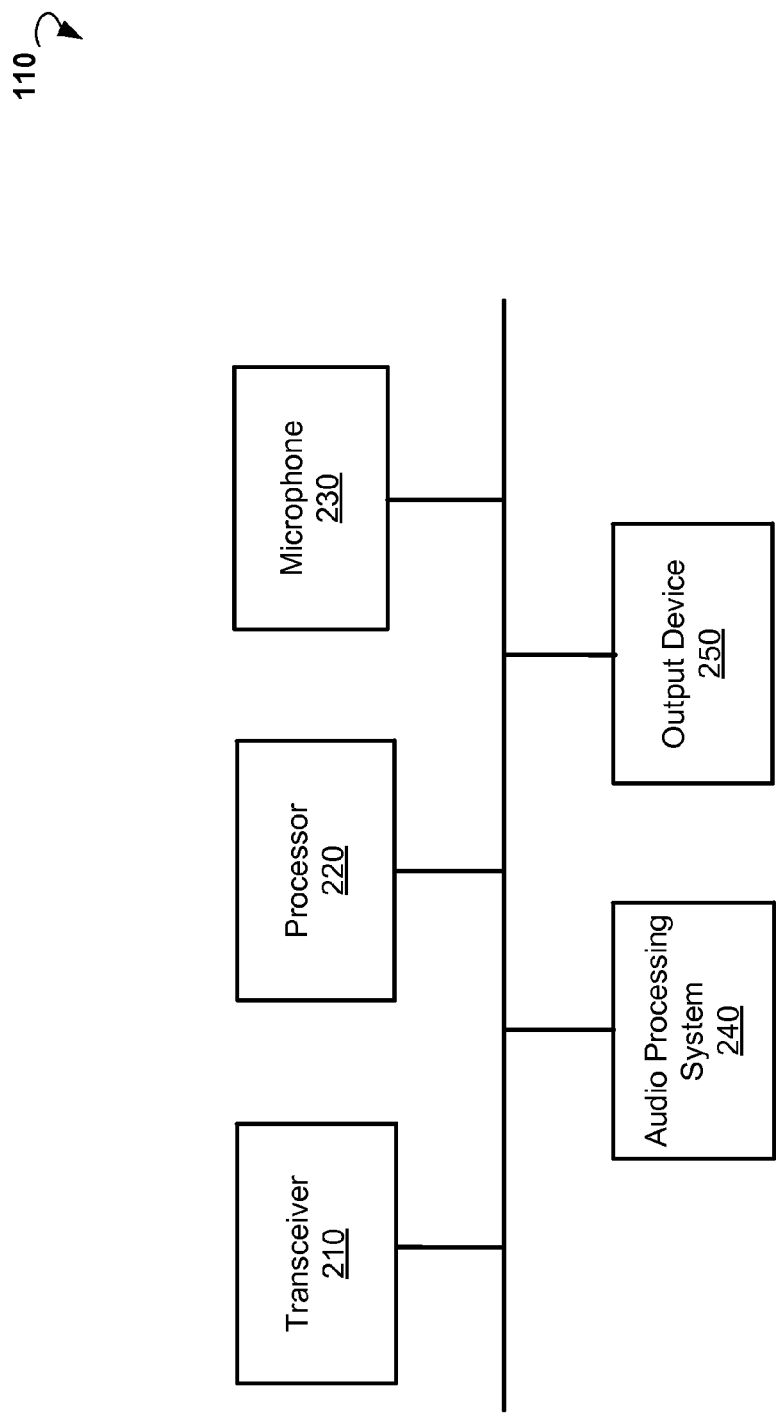
FIG. 2 is a block diagram illustrating an audio device, according to an exemplary embodiment.

FIG. 2 is a block diagram illustrating an exemplary audio device 110 suitable for implementing methods for multi-sourced noise suppression in various embodiments. The example audio device 110 may include a transceiver 210, a processor 220, a microphone 230, an audio processing system 240, and an output device 250. The audio device 110 may include more or other components to provide a particular operation or functionality. Similarly, the audio device 110 may comprise fewer components to perform functions similar or equivalent to those depicted in FIG. 2.

In the example in FIG. 2, the transceiver 210 is configured to communicate with a network such as the Internet, Wide Area Network (WAN), Local Area Network (LAN), cellular network, and so forth, to receive and/or transmit audio data stream. The received audio data stream may be forwarded to the audio processing system 240 and the output device 250.

The processor 220 may include hardware, firmware, and software that implement the processing of audio data and various other operations depending on a type of the audio device 110 (e.g., communications device and computer). A memory (e.g., non-transitory computer readable storage medium) may store, at least in part, instructions and data for execution by processor 220.

The audio processing system 240 may include hardware, firmware, and software that implement the encoding of acoustic signals. For example, the audio processing system 240 is further configured to receive acoustic signals from an acoustic source via microphone 230 (which may be one or more microphones or acoustic sensors) and process the acoustic signals. After reception by the microphone 230, the acoustic signals may be converted into electric signals by an analog-to-digital converter.

An exemplary output device 250 includes any device which can provide an audio output to a listener (e.g., the acoustic source). For example, the exemplary output device 250 comprises a speaker, a class-D output, an earpiece of a headset, or a handset on the audio device 110.

Figure 3:
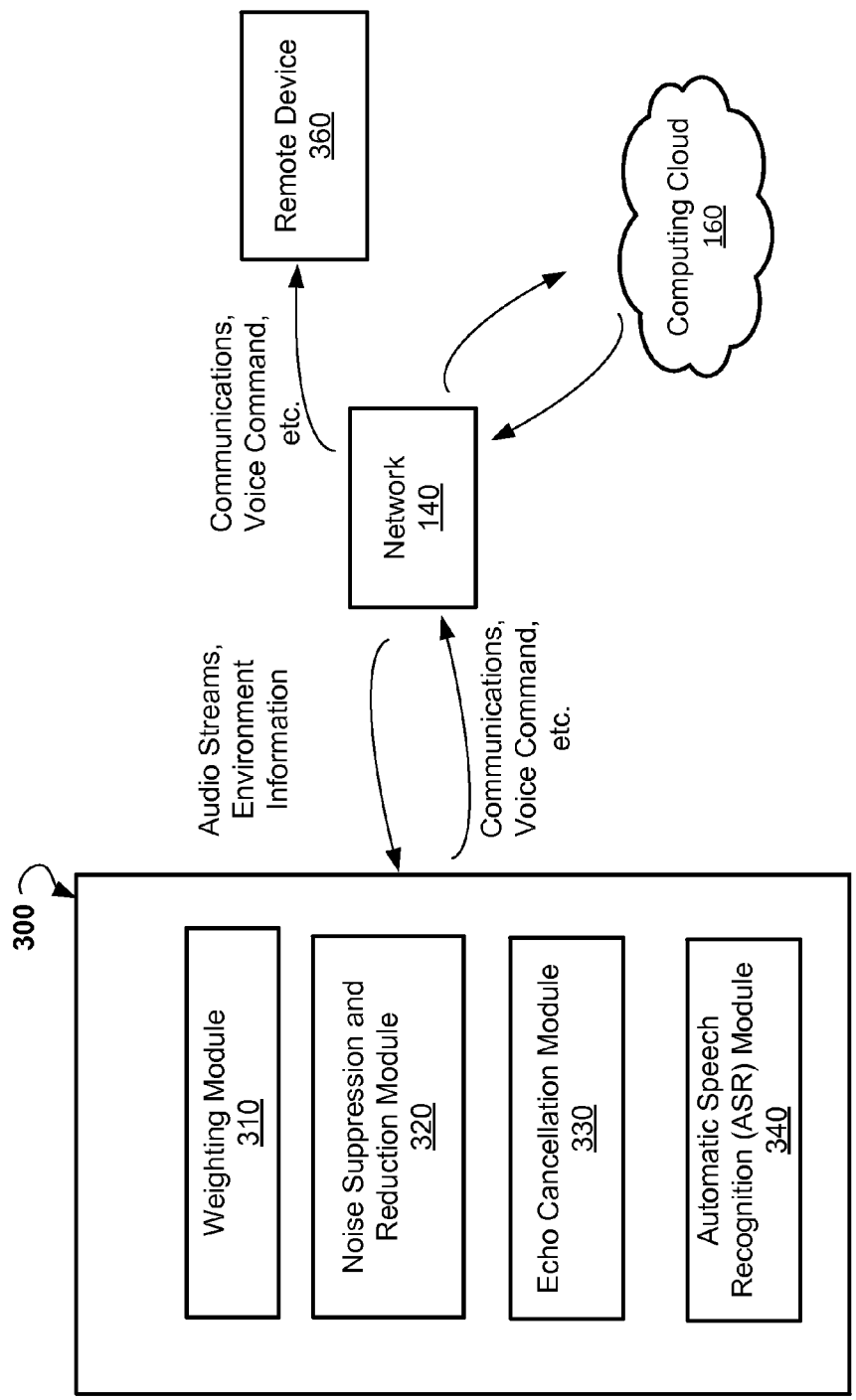
FIG. 3 is a block diagram illustrating a system for multi-sourced noise suppression, according to an exemplary embodiment.

FIG. 3 is a block diagram illustrating a system 300 suitable for implementing a method for multi-sourced noise suppression, according to an exemplary embodiment. The example system 300 may be incorporated in the controller 150 (shown in FIG. 1) and operable to receive audio streams from one or more audio devices 110 (shown in FIG. 1) via network 140 (also shown in FIG. 1). The system 300 may include weighting module 310, noise suppression and reduction module 320, echo cancellation module 330, and ASR module 340. In some embodiments, the modules 310-340 of system 300 are implemented as instructions stored in a memory and executed by a processor of the controller/coordinator 150. In other embodiments, the system 300 may be implemented as hardware, a chip, or firmware incorporated in controller/coordinator 150. The system 300 may operate in an environment using a protocol suitable for communication with and among Internet of Things devices.

In further embodiments, some or all of the modules 310-340 of system 300 may be implemented as instructions stored and executed on a remote server or by cloud-based computing resource services 160 (also shown in FIG. 1). The controller 150 may communicate to the computing cloud 160, via network 140, a command to send audio stream and other data for processing, and may receive the results of computations.

In various embodiments, the controller 150 may be operable to perform diversity pooling. That is, the controller 150 may receive N streams of audio data from N audio devices 110. Each audio stream may include a voice signal and noise. The weighting module 310 may execute an algorithm that assigns a weight to each of the received audio data streams based on the quality of the audio data, determined by a quality metric. In certain embodiments, the weight associated with an audio stream is calculated based on signal-to-noise ratio as a quality metric. The quality of the audio data may depend on a particular environment in which the corresponding audio device 110 operates. In certain embodiments, therefore, the weight assigned to a stream of audio data depends on an audio device's 110 environmental conditions. For example, if a user 120 is watching TV, a microphone located directly above the user 120 may be optimal for picking up the user's speech. However, if the microphone is located near a heating, ventilation, or air condition (HVAC) system, the microphone may not be optimal due to the lowered signal-to-noise ratio when, for example, the air conditioner (AC) is in operation. Thus, the weight assigned to the audio data from the microphone may depend on whether a noise source, such as the AC in this example, is active or not.

In some embodiments, quality of audio data and weight assigned to the audio data may depend on particular characteristics of components of the corresponding audio device 110 (for example, a type of a microphone, a type of an audio processing system, and so forth).

The exemplary system 300 performs distributed noise suppression and reduction to separate noise from audio data and distill cleaned speech using multiple audio stream data and weights assigned to the audio stream data, in some embodiments. For example, in audio devices 110 with multiple microphones, an inter-microphone level difference (ILD) between energies of the primary and secondary acoustic signals may be used for acoustic signal enhancement. Methods and systems for acoustic signal enhancement are described, for example, in U.S. patent application Ser. No. 11/343,524 (patented as U.S. Pat. No. 8,345,890), entitled "System and Method for Utilizing Inter-Microphone Level Differences for Speech Enhancement", the disclosure of which is incorporated herein by reference for the above-identified purposes.

In addition, in some embodiments, by using multiple audio stream data and weights assigned to the audio stream data, the system 300 may perform various other processing such as echo cancellation and gain control, to name a few. Further details regarding applying weighting to modify acoustic signals is found in commonly assigned U.S. patent application Ser. No. 12/893,208 entitled "Systems and Methods for Producing an Acoustic Field Having a Target Spatial Pattern" (patented as U.S. Pat. No. 8,615,392) and incorporated by reference herein. As the user 120 walks around the house, for example, and as environmental conditions change, the weight assigned to each audio stream from each audio device 110 is dynamically adjusted, and signal processing (gain control, echo cancellation, noise suppression, etc.) is performed to ensure optimal audio quality and speech recognition at all times.

The above described embodiments of the method may operate in the IoT environment. Further details regarding the method for operating in an IoT environment according to various embodiments are now described.

In some embodiments, each of the audio devices 110 includes at least one microphone and is associated with the Internet of Things, also referred to herein as Internet of Things devices or IoT devices.

In some embodiments, the method, and in particular the weighting, includes generating acoustic activity maps by locating, identifying, and mapping target sound(s) (e.g., speech) and noise source(s) in a single or multi-room Internet of Things environment by combining multiple audio streams from microphones on multiple Internet of Things devices (e.g., audio devices 110) to create a multidimensional acoustic view of the environment.

Acoustic signatures may be continually updated between the IoT devices using sound sources in the vicinity of the IoT devices.

Auditory scene analysis and scene classifiers may be used to identify noise and target sound types. Further details regarding exemplary scene analysis and scene classifiers may be found in U.S. patent application Ser. No. 14/335,850 entitled "Speech Signal Separation and Synthesis Based on Auditory Scene Analysis and Speech Modeling" and U.S. patent application Ser. No. 12/860,043 (patented as U.S. Pat. No. 8,447,596) entitled "Monaural Noise Suppression Based on Computational Auditory Scene Analysis", both of which are incorporated by reference herein. In some embodiments, signaling mechanisms, including transmitters and receivers, between the IoT devices are used to identify locations between the IoT devices relative to each other.

In various embodiments, the method includes, based on the acoustic activity maps, identifying the optimal audio device that provides good signal-to-noise ratio (SNR) for the talker (e.g., user 120) along with identification of the optimal audio devices (among the IoT devices) for measuring noise in the talker's environment and surrounding environment. The identification may be used for assigning weights to the audio stream associated with the audio device. In various embodiments, a combination of audio streams from the audio devices is utilized to enhance audio processing (e.g., noise cancellation, noise suppression, etc.) of the target signal. As a result, various embodiments provide for a seamless, hands-free voice communication experience as the talker (e.g., user 120) moves around in a single room or across different rooms. In a further result, various embodiments provide for a graceful, smooth handoff of whichever IoT device has the optimal SNR along with a graceful, smooth handoff of whichever IoT device has optimal noise measurement.

Further, in some embodiments, the method provides for a fluid human-computer voice interface, which can result in high-performing ASR across the IoT devices in the Internet of Things environment.

In addition, the method in certain embodiments provides for having IoT devices communicate with the user 120 (e.g., using a loudspeaker or other communication functionality of the IoT devices) at the optimal place, at the optimal time, and at the optimal volume. Certain embodiments would thus provide for a seamless handoff between and among the IoT devices that are listening to and communicating with the user 120.

In some embodiments, the resulting cleaned voice signal may be provided to an ASR module 340, for example, to distill a spoken command. In some embodiments, the ASR module 340 may associate a remote device 360 with the spoken command (e.g., a television, streaming device, or the like, depending on the command context) and provide the spoken command to the associated remote device 360 for further processing. In other embodiments, the cleaned voice is used for various voice interfaces and other services.

Example 1. Remote Command

By way of example and not limitation, in some embodiments, a user 120 provides a voice command to one device from the audio device 110 (shown in FIG. 1) and the device may relay the command to a different device at a different location via the network 140. The voice command can be picked up by microphones located on, or connected to, various audio devices 110 around the premises (e.g. a house) and sent to the controller/coordinator 150. The controller/ coordinator 150 may include a router or a device, such as a TV. Once the controller/coordinator 150 receives the command, it may request that all other devices send a time-stamped audio command (as well as a small portion of the preceding audio for context). Operations such as weighting audio streams, noise suppression, echo cancellation, gain control, and execution of an ASR algorithm may be performed using the multi-microphone data to clean up the voice command. The data processing can be carried out locally, on the controller 150, or on the computing cloud 160. Thus, as the user 120 walks around the premises and utters voice commands in this example, the commands are picked up, processed, and sent to the ASR module 340.

In some embodiments, the user 120 may send remote commands to devices located in other areas of the premises, for example, a garage area of a house. In other embodiments, the user 120 may send remote commands to a vehicle or receive notifications from the vehicle if someone tries to start the vehicle (for example, if the user's teenage son is trying to take the vehicle for a ride).

In further embodiments, the user 120 may send remote commands to a device located in other premises, such as a second house owned by the user's elderly parents, for example, in which case, the command may be relayed through the computing cloud.

Example 2. Live-Talk Communication

The technology described herein may also allow for real-time communications between two or more users 120 located in different parts of the premises or between users in separate premises, (e.g. different houses).

By way of example and not limitation, user #1 utters a voice command, such as "connect with my dad", and this command may be picked up by various audio devices 110 located near user #1. In various embodiments, different audio streams containing the command are processed to distill cleaned speech and recognize the command, as described in example 1, above. Once the command is understood by one or more controlling devices in this example, communication between audio devices 110 is established with one or more devices located near user #2 (e.g. dad). User #1 and user #2 talk through the established communications link between audio devices 110 located near each user 120. The speech from user #1 is received by one or more audio devices 110 in the vicinity of user #1, processed to distill cleaned speech, as described herein, and transmitted to one or more audio devices 110 in the vicinity of user #2 (e.g. the user's dad). Speech from user #2 (e.g. user's dad) can similarly be processed and received by user #1.

In some embodiments, if user #2 is located in the same house, the data may be transferred through, for example, a local network, using wireless (e.g. WiFi), or wired (e.g. Ethernet) connections. In other embodiments, if user #2 is located in a different house, the data is sent through a WAN, or other infrastructure including a computing cloud environment. A placement of sufficient networked audio devices 110, using the technology described herein, may enable a user 120 to connect to and speak with another person while the user 120 moves throughout the premises (e.g. house).

Figure 4:
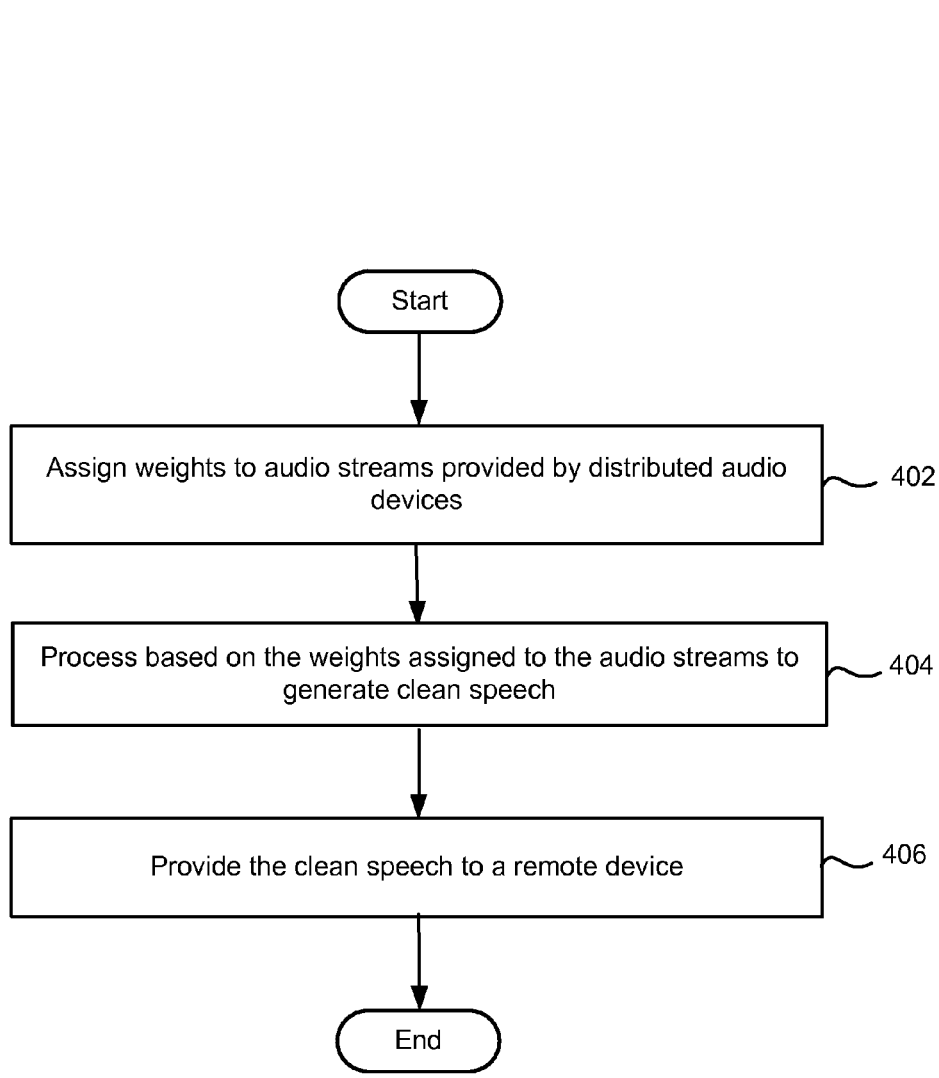
FIG. 4 is a flow chart illustrating a method for multi-sourced noise suppression, according to an exemplary embodiment.

FIG. 4 is a flow chart illustrating a method 400 for multi-sourced noise suppression, according to an exemplary embodiment. The example method 400 may commence at operation 402 by assigning weights to audio streams. The audio streams can be provided by distributed audio devices 110. The audio streams may contain voice and noise. In various embodiments, the weights applied to an audio stream are determined based on the quality of the audio stream, using a signal-to-noise ratio, for example. Continued processing at operation 404, based on the weights assigned to the audio streams, can generate cleaned speech. Processing may include gain control, noise suppression, noise reduction, echo cancellation, and the like. At operation 406, the exemplary method includes providing cleaned speech to a remote device, (e.g., remote device 360), for further processing such as ASR.

Figure 5:
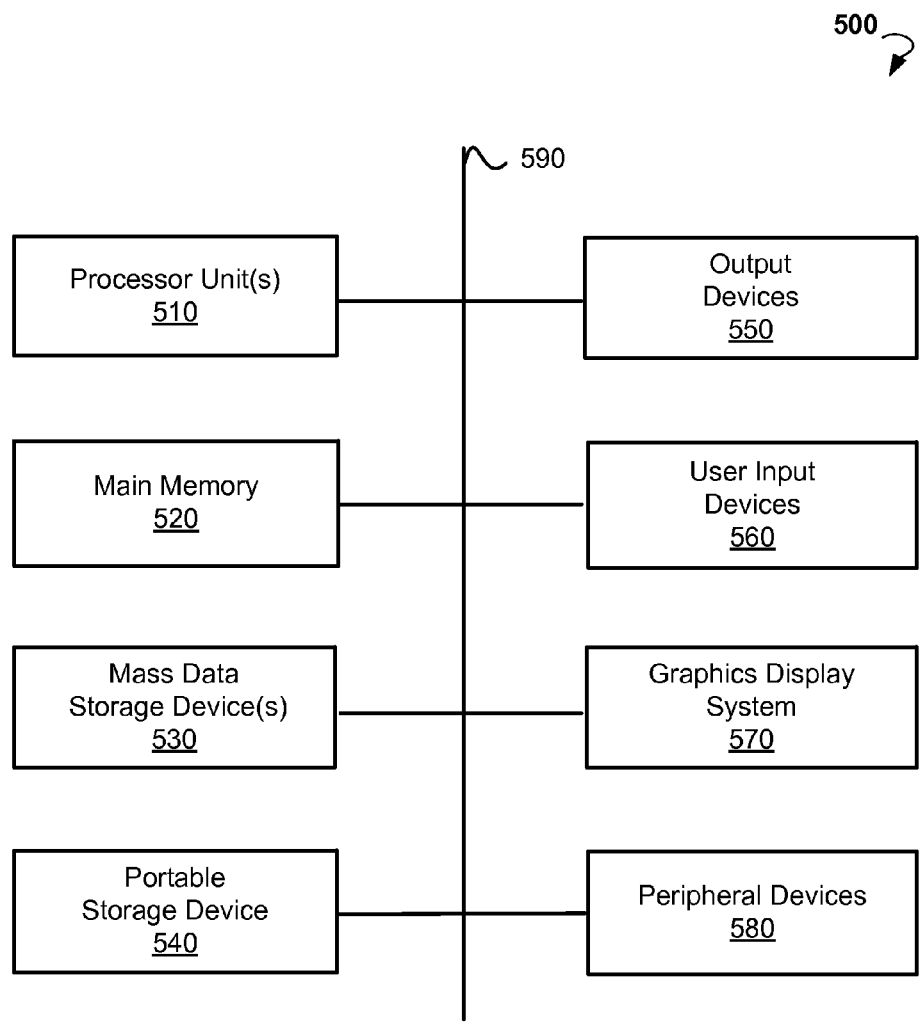
FIG. 5 is a block diagram illustrating an exemplary computing system in which embodiments of the disclosed technology are implemented.

FIG. 5 illustrates an exemplary computer system 500 that may be used to implement various elements (e.g., audio devices, controller, etc.) of various embodiments of the present technology. The computer system 500 of FIG. 5 may be implemented in the context of computing systems, networks, servers, or combinations thereof. The computer system 500 of FIG. 5 includes one or more processor units 510 and main memory 520. Main memory 520 stores, in part, instructions and data for execution by processor units 510. In various embodiments, main memory 520 stores the executable code when in operation. The computer system 500 of FIG. 5 further includes one or more mass data storage device(s) 530, one or more portable storage device 540, output devices 550, user input devices 560, a graphics display system 570, and peripheral devices 580.

The components shown in FIG. 5 are depicted as being connected via a single bus 590. The components may be connected through one or more data transport means. Processor units 510 and main memory 520 are connected via a local microprocessor bus, and the mass data storage device(s) 530, peripheral device(s) 580, portable storage device 540, and graphics display system 570 are connected via one or more input/output (I/O) buses.

Mass data storage device(s) 530, which can be implemented with a magnetic disk drive, solid state drive, or an optical disk drive, is a non-volatile storage device for storing data and instructions for use by processor units 510. Mass data storage device(s) 530 stores the system software for implementing embodiments of the present disclosure, and all or part of the software may be loaded into main memory 520 during program execution.

Portable storage device 540 operates in conjunction with a portable non-volatile storage medium, such as a flash drive, floppy disk, compact disk, digital video disc, or Universal Serial Bus (USB) storage device, to input and output data and software code to and from the computer system 500 of FIG. 5. System software for implementing embodiments of the present disclosure may be stored on portable medium and input into the computer system 500 via the portable storage device 540.

User input devices 560 can provide a portion of a user interface. User input devices 560 may include one or more microphones, an alphanumeric keypad, such as a keyboard, a pointing device, such as a mouse, a trackball, a trackpad, a stylus, or cursor direction keys, for entering and manipulating alphanumeric and other information User input devices 560 may also include a touchscreen. Additionally, the computer system 500 as shown in FIG. 5 includes output devices 550. Suitable output devices 550 include speakers, printers, network interfaces, and monitors.

Graphics display system 570 includes a liquid crystal display (LCD) or other suitable display device. Graphics display system 570 is configurable to receive textual and graphical information and processes the information for output to the display device.

Peripheral devices 580 may include any type of computer support device to add additional functionality to the computer system 500.

The components provided in the computer system 500 of FIG. 5 are those typically found in computer systems that may be suitable for use with embodiments of the present disclosure and are intended to represent a broad category of such computer components that are well known in the art. Thus, the computer system 500 of FIG. 5 can be a personal computer (PC), hand held computer system, telephone, mobile computer system, workstation, tablet, phablet, mobile phone, server, minicomputer, mainframe computer, wearable, embedded device, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

The processing for various embodiments may be implemented in software that is cloud-based. In some embodiments, the computer system 500 is implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or the systems may be accessible to other users who deploy applications within the computing infrastructure to obtain the benefit of large computational or storage resources.

The cloud may be formed, for example, by a network of web servers that comprise a plurality of computing devices, similar in configuration to the computer system 500, with each server, or at least a plurality thereof, providing processor and/or storage resources. These servers may manage workloads provided by multiple users (e.g., cloud resource customers or other users). Typically, each user places workload demands upon cloud resources that vary in real-time. The nature and extent of these variations may depend, for example, on the type of business served by the resources.

The present technology is described above with reference to example embodiments. The illustrative discussions above are not intended to be exhaustive or to limit embodiments of the disclosed subject matter to the forms disclosed. Modifications and variations are possible in view of the above teachings, to enable others skilled in the art to utilize those embodiments as may be suitable to a particular use.

What is claimed is:

1. A method for multi-sourced noise suppression, the method comprising:
   assigning weights to audio streams, the audio streams being provided substantially synchronously by a plurality of audio devices, the weights depending on quality of the audio streams, wherein the assigning weights includes generating an acoustic activity map by locating, identifying and mapping target sounds and noise sources in at least one of a single room and multi-room environment, so as to create a multidimensional acoustic view of the environment;
   based on the weights, performing noise suppression processing on the audio streams to generate a cleaned voice signal;
   providing the cleaned voice signal from the noise suppression processing to at least one remote device for further processing; and
   based on the acoustic activity map, selecting an optimal one of the plurality of audio devices to communicate with the user.

2. The method of claim 1, wherein each of the audio devices includes at least one microphone and the audio devices are connected in a dynamic network of connected devices, such that the audio devices are connected as part of an Internet of Things environment.

3. The method of claim 1, wherein the weights are proportional to at least one quality metric for the audio stream, the quality metric comprising at least one signal to noise ratio (SNR).

4. The method of claim 1, wherein the performing of the noise suppression processing is provided in combination with at least one of:
   performing noise reduction; and
   performing echo cancellation.

5. The method of claim 1, further including continually updating acoustic signatures between the audio devices based on one or more sound sources located in the vicinity of the audio devices.

6. The method of claim 1, wherein auditory scene analysis and scene classifiers are used for the identifying of target sounds and noise sources.

7. The method of claim 1, wherein the audio streams include time stamps, the method further comprising, based on the time stamps, synchronizing the audio devices to a common time source.

8. The method of claim 7, further comprising, based on the acoustic activity map, assigning weights to the audio streams based on the SNR quality metric.

9. The method of claim 8, further comprising, based on the acoustic activity map, assigning weights to the audio streams further based on the degree to which the associated audio device, that provides a respective one of the audio streams, measures noise.

10. The method of claim 1, wherein the communication with the user is via a loudspeaker of the optimal audio device.

11. The method of claim 7, wherein the performing of the noise suppression processing is provided in combination with at least one of:
    performing noise reduction; and
    performing echo cancellation.

12. The method of claim 1, wherein the audio streams comprise at least one voice command to perform at least one of activating the remote device and communicating with another user.

13. The method of claim 1, wherein the further processing comprises automatic speech recognition (ASR) processing of the cleaned voice signal.

14. The method of claim 13, wherein, based on the ASR processing, a context of a command to connect to another user is recognized and the cleaned voice signal is communicated to at least one of the audio devices located in proximity to the other user for establishing two way communication therewith.

15. A system for multi-sourced audio processing, the system comprising:
a processor; and
a memory communicatively coupled with the processor, the memory storing instructions, which, when executed by the processor, perform a method comprising:
assigning weights to audio streams, the audio streams being provided substantially synchronously by a plurality of audio devices, the weights depending on quality of the audio streams;
based on the weights, performing noise suppression processing on the audio streams to generate a cleaned voice signal, and
providing the cleaned voice signal from the noise suppression processing to a remote device for further processing,
wherein each of the audio devices includes at least one microphone and wherein the plurality of audio devices are physically separate from each other but connected in a dynamic network of connected devices, such that the audio devices are connected as part of an Internet of Things environment.

16. The system of claim 15, wherein the assigning weights includes generating an acoustic activity map by locating, identifying and mapping target sounds and noise sources in at least one of a single room and multi-room environment, so as to create a multidimensional acoustic view of the environment.

17. A non-transitory computer-readable storage medium having embodied thereon instructions, which, when executed by at least one processor, perform steps of a method, the method comprising:
assigning weights to audio streams, the audio streams being provided substantially synchronously by a plurality of audio devices, the weights depending on quality of the audio streams, wherein the assigning weights includes generating an acoustic activity map by locating, identifying and mapping target sounds and noise sources in at least one of a single room and multi-room environment, so as to create a multidimensional acoustic view of the environment;
based on the weights, performing noise suppression processing on the audio streams to generate a cleaned voice signal;
providing the cleaned voice signal from the noise suppression processing to at least one remote device for further processing; and
based on the acoustic activity map, selecting an optimal one of the plurality of audio devices to communicate with the user.

18. The method of claim 1, wherein one or more of the plurality of audio devices is incorporated in an Internet of Things device.

19. The non-transitory computer-readable medium of claim 17, wherein one or more of the plurality of audio devices is incorporated in an Internet of Things device.

20. The system of claim 15, further comprising:
a controller for receiving the audio streams from the plurality of audio devices via the dynamic network and for performing the noise suppression processing on the received audio streams.

* * * * *